US006077186A

United States Patent [19]

Kojima et al.

[11] Patent Number: 6,077,186

[45] Date of Patent: Jun. 20, 2000

[54] INTERNAL COMBUSTION ENGINE STARTING DRIVE CONTROL SYSTEM FOR HYBRID VEHICLE

[75] Inventors: Shinichi Kojima, Susono; Hidehiro Oba, Numazu; Kazumi Hoshiya, Gotenba, all of Japan

[73] Assignee: Toyota Jidosha Kabushiki Kaisha, Toyota, Japan

[21] Appl. No.: 09/206,305

[22] Filed: Dec. 7, 1998

[30] Foreign Application Priority Data

Dec. 12, 1997 [JP] Japan .................................... 9-362618

[51] Int. Cl.[7] ........................................................ B60K 1/02

[52] U.S. Cl. ...................... 477/3; 477/5; 477/8; 180/65.2

[58] Field of Search ................................. 477/5, 7, 8, 12, 477/3; 180/65.2–65.7; 290/40 C

[56] References Cited

FOREIGN PATENT DOCUMENTS 9-193676 7/1997 Japan .

9-222064 8/1997 Japan .

*Primary Examiner*—Khoi Q. Ta

*Attorney, Agent, or Firm*—Oliff & Berridge, PLC

[57] ABSTRACT

A drive control system for starting an internal combustion engine of a hybrid vehicle running while transmitting the output of an electric motor to a power transmission line for the run, by coupling the internal combustion engine to the power transmission line. The drive control system comprises: a start demand deciding unit for deciding a demand for the start of the internal combustion engine; and an assist setting unit for raising the output torque of the electric motor, when the demand for starting the internal combustion engine is decided by the start demand deciding unit, by a torque corresponding to either a motoring torque necessary for rotating the internal combustion engine or a summed torque of the motoring torque and an inertia torque according to the changing rate of the revolution speed of the internal combustion engine.

22 Claims, 24 Drawing Sheets

START OF INPUT CLUTCH APPLICATION PROCESSING
001
ENGINE START DEMANDING FLAG F1 ON ?
NO
YES
002
ENGINE START CONTROL FLAG F2 ON
003
F2 : ON ?
NO
YES
INPUT CLUTCH OIL PRESSURE PROCESSING
004
MOTOR TORQUE PROCESSING
005
ENGINE TORQUE PROCESSING
006
DOWNSHIFT START ALLOWANCE PROCESSING
007
008
INPUT CLUTCH APPLICATION END DECISION FLAG F3 ON ?
NO
YES
009
F2 ← OFF
F3 : ON OUTPUT
END 2
1
024
NE ≧ N1 ?
NO
YES
026
STANDBY OIL PRESSURE TIMER OVER PREDETERMINED VALUE ?
NO
YES
025
FQF TIME LEARNING PROCESSING
F6 ← OFF
027
OIL PRESSURE SWEEP-UP FLAG F7 ON
028
029
NO
F7 : ON ?
YES
030
F5 : ON ?
NO
YES
031
NE < N2 ?
NO
YES
032
INCREASE INPUT CLUTCH OIL PRESSURE SWEEP-UP GRADIENT
033
SET INPUT CLUTCH OIL PRESSURE SWEEP-UP GRADIENT TO ORDINARY VALUE
SWEEP-UP OIL PRESSURE COMMAND
034
4
3

START OF OIL PRESSURE SWEEP-UP
FQF TIME
(T'1)
T1
T2
FQF OIL PRESSURE
LOW-PRESSURE STANDBY OIL PRESSURE
MAX OIL PRESSURE
CONTINUATION OF PREDETERMINED TIME PERIOD
N3
N1
INPUT CLUTCH COMMAND / OIL PRESSURE
MOTOR RPM
ENGINE RPM
t1
t2
t8
t3
t4
t5
TIME

FUEL INJECTION FLAG
INJECTION ON
INJECTION OFF
CI CONTROL START FLAG F2
START ON
START OFF
SPEED CHANGE CONTROL START FLAG
START ON
START OFF
POWER–ON DOWNSHIFT FLAG F5
ON
OFF
STARTS OF FUEL INJECTION AND SPEED CHANGE AT SIMULTANEOUS CONTROL OF CI CLUTCH CONTROL
START OF FUEL INJECTION FOR NO DEMAND OF DOWNSHIFT CONTROL
t1
t6
t2
t7
t4
TIME

START OF ASSIST TORQUE WORKING PROCESSING SUBROUTINE
081
ASSIST TORQUE > 0 ?
NO
YES
082
FIRST ?
NO
YES
083
CLEAR ASSIST COUNTER
084
COUNT UP ASSIST COUNTER
085
ASSIST COUNTER < PREDETERMINED VALUE ?
NO
YES
086
ASSIST TORQUE
= ASSIST TORQUE X ASSIST COUNTER
/ PREDETERMINED VALUE
RETURN

START OF ASSIST TORQUE WORKING PROCESSING SUBROUTINE
081
ASSIST TORQUE > 0 ?
NO
YES
082
FIRST ?
NO
YES
084
COUNT-UP ASSIST COUNTER
083
CLEAR ASSIST COUNTER
085
ASSIST COUNTER < PREDETERMINED VALUE ?
NO
YES
086-1
ASSIST TORQUE
= ASSIST COUNTER X SKIP-UP RATE
+ ASSIST TORQUE X (1 - SKIP-UP RATE)
X ASSIST COUNTER
/ ASSIST COUNTER UPPER LIMIT
RETURN

INTERNAL COMBUSTION ENGINE STARTING DRIVE CONTROL SYSTEM FOR HYBRID VEHICLE

BACKGROUND OF THE INVENTION

1. Field of the Invention

The present invention relates to a drive control system for a hybrid vehicle which is equipped as its prime mover with an internal combustion engine such as a gasoline engine or a Diesel engine and an electric motor such as a motor or a motor/generator to be energized by an electric power to output a torque. More particularly, the invention relates to a drive control system for the hybrid vehicle of the type capable of employing both the internal combustion engine and the electric motor as the prime mover for its run.

2. Related Art

The hybrid vehicle is a vehicle which has been developed for improving the deterioration of exhaust gases or the reduction in the fuel economy when it is run with only the internal combustion engine. On the hybrid vehicle, there is mounted such a motor/generator together with the internal combustion engine as acts as a motor or a generator for generating the running torque with the electric power. As the vehicle of this kind, there are known both the so-called "series" hybrid vehicle employing the internal combustion engine exclusively as the prime mover for generating the electric power and the so-called "parallel" hybrid vehicle capable of employing the internal combustion engine as the prime mover for the run, too.

On the other hand, the internal combustion engine cannot be started merely by feeding it with a fuel but has to be forcibly turned by an external force before the start. For this, the internal combustion engine is generally equipped with a motor called the "starter". In the vehicle of the parallel hybrid type, the internal combustion engine can be coupled together with the electric motor to a power transmission line for the run, so that it can be started by turning it forcibly with the electric motor. In order that the exhaust gases may not be deteriorated at a low speed such as at the start while improving the fuel economy, therefore, the vehicle is run with the electric motor. When the internal combustion engine is to be started at a considerably high running speed, moreover, the output of the electric motor being used for the run is transmitted to the internal combustion engine. As a result, the internal combustion engine can be started without employing the starter of the prior art. In other words, the starter can be abolished to reduce the number of parts.

A system for effecting the start control of the internal combustion engine is disclosed in Japanese Patent Laid-Open No. 9-193676. In the disclosed system, there is provided a drive system which is constructed by coupling the internal combustion engine through an input clutch to a predetermined rotary element in a planetary gear mechanism, by coupling the motor/generator to another rotary element, and by using a third rotary element as an output member. In the system of the prior art, moreover, while the vehicle is being run with the output of the motor/generator, the input clutch is applied to transmit the torque to the internal combustion engine so that the internal combustion engine is forcibly turned and started.

According to the system of the prior art described above, the internal combustion engine can be started without using the starter. When the input clutch is applied to rotate the internal combustion engine, however, the output torque of the electric motor, as used for the run, is consumed partially as a torque (as will be called the "motoring torque" and "inertia torque") for rotating the internal combustion engine so that the driving force temporarily drops. In other words, the running torque drops according to the application of the input clutch, and this drop may be physically felt as a shock.

After the internal combustion engine was started, on the other hand, the vehicle is run by both the electric motor and the internal combustion engine. It is, therefore, an ordinary practice to apply the input clutch completely after the revolution speeds of the electric motor and the internal combustion engine became equal. Even if the revolution speeds of the electric motor and the internal combustion engine are equal, their changing rates (or their rising rates) may be different from each other. Then, even after the input clutch was completely applied, one prime mover having a lower rising rate of the revolution speed, i.e., the electric motor or the internal combustion engine may be dragged by the other prime mover having a higher rising rate of the revolution speed. As a result, the complete application of the input clutch may cause a situation as if the running resistance were raised, and the shock may arise due to the drop of the driving force.

While the vehicle is being run by the electric motor, moreover, the input clutch is applied to raise the revolution speed of the internal combustion engine, and the fuel is fed to start the internal combustion engine. In this case, the output torque, as generated by the combustion in the internal combustion engine, is added to the torque for the run. If the input clutch then has a sufficient transmission torque capacity, therefore, the addition of the output torque of the internal combustion engine to the running torque of the electric motor will raise the driving force abruptly, and this rise may be physically felt as the shock.

Here, the input clutch can be exemplified by a multi-disc friction clutch to be hydraulically applied, as in the foregoing Japanese Patent Laid-Open. When the clutch of this kind is to be applied, valves in an oil pressure circuit are switched to feed the oil pressure from its source to the clutch. In this case, a line resistance unavoidably arises to cause a time delay till the input clutch is actually applied in response to an instruction for the application. In the input clutch, moreover, there is a clearance between the friction discs and between the friction discs and a piston for pushing the former. When the input clutch is fed with the oil pressure, therefore, the torque is not transmitted between the friction discs before the clearance (or pack clearance) is clogged. During this clogging of the pack clearance, the internal combustion engine cannot be rotated to cause the time delay in the control for rotating the internal combustion engine. Because of this delay factor in the mechanical construction, the responsibility of the control for starting the internal combustion engine may be degraded.

Even after the revolution speed of the internal combustion engine was raised by feeding it with the fuel to such a value as to continue the combustion, the internal combustion engine neither generates the torque instantly at the start of the fuel feed nor effects the continuous run, but the generation of the torque may be delayed by the influences such as the temperature of the internal combustion engine or the ambient temperature. This delay may deteriorate, together with the delay in the action of the input clutch, the responsibility of the start control of the internal combustion engine, or the rise in the driving force may be delayed to cause the so-called "slow" feeling.

SUMMARY OF THE INVENTION

A main object of the invention is to provide a drive control system which can prevent the shock, as might otherwise be caused when an internal combustion engine is to be started while the vehicle is being run by an electric motor, and can improve the responsibility.

According to the drive control system having a first featuring construction of the invention, when the internal combustion engine is to be started while the vehicle is being run by the electric motor, the torque to be outputted from the electric motor is set to the sum of the torque necessary for keeping the running state and the torque necessary for rotating the internal combustion engine. This setting makes it possible to prevent the reduction in the driving force for the run and to avoid the shock due to the start of the internal combustion engine in advance.

According to the drive control system having a second featuring construction of the invention, when the internal combustion engine is started so that its revolution speed reaches that of the electric motor, the driving force, as demanded by the preceding run, can be kept by the output of the internal combustion engine. By lowering the output torque of the electric motor, therefore, the driving force as the entire hybrid vehicle can be prevented from becoming excessive while preventing the shock.

According to the drive control system having a third featuring construction of the invention, when the revolution speed of the internal combustion engine reaches that of the electric motor, moreover, of the torque outputted by the electric motor, the torque corresponding to the torque used for rotating the internal combustion engine is reduced. This reduction makes it possible to prevent an abrupt change in the driving force of the entire hybrid vehicle before and after the start of the internal combustion engine and the shock which might otherwise be caused by the abrupt change.

According to the drive control system having a fourth featuring construction of the invention, while the internal combustion engine is being rotated by the output torque of the electric motor so that it may be started, a shortage in either the output torque of the electric motor or the torque for rotating the internal combustion engine can be detected in terms of the reduction in the revolution speed of the internal combustion engine, and the output torque of the electric motor can be raised on the basis of the detection result. As a result, it is possible to prevent a temporary shortage of the driving force during the run and the resultant shock.

According to the drive control system having a fifth featuring construction of the invention, while the internal combustion engine is rotated by the electric motor so that it may be started, the excess or shortage of the output of the electric motor is monitored at all times in terms of the revolution speed of the electric motor so that the output of the electric motor is increased when the revolution speed drops due to the shortage of the output of the electric motor. As a result, it is possible to prevent a temporary reduction of the driving force and the resultant shock in advance.

According to the drive control system having a sixth featuring construction of the invention, when the internal combustion engine is rotated by the electric motor so that it may be started, the fuel is fed to the internal combustion engine at the instant when the revolution speed of the internal combustion engine comes into synchronism with that of the electric motor. At this instant, there has ended the state in which the electric motor outputs not only the motive force for the run but also the motive force for rotating the internal combustion engine. For the driving force for the run, therefore, the output of the internal combustion engine is not added to that of the electric motor. As a result, it is possible to prevent a temporary rise in the driving force and the resultant shock.

According to the drive control system having a seventh featuring construction of the invention, as the fuel is fed to the internal combustion engine so that it starts to output the torque, the output of the electric motor is accordingly lowered. As a result, the driving force is kept constant as a whole by the increase and decrease of those outputs so that the shock due to the abrupt change in the driving force can be prevented.

According to the drive control system having an eighth featuring construction of the invention, the fluctuation in the revolution speed of the internal combustion engine, i.e., the fluctuation in the output exerts no influence upon the driving force for the run so that the shock due to the change in the driving force can be prevented. Immediately after the start of the internal combustion engine, more specifically, the revolution speed of the internal combustion engine may be made unstable by the low revolution speed. In this unstable state, however, the torque to be transmitted from the internal combustion engine to the power transmission line is not gradually increased so that the disturbance in the driving force and the resultant shock can be prevented.

According to the drive control system having a ninth featuring construction of the invention, when the RPM of the internal combustion engine rises so high that the internal combustion engine starts outputting with the feed of the fuel, a downshift can be effected in an automatic transmission. When the start of the internal combustion engine and the downshift in the automatic transmission are simultaneously decided, the downshift is executed as soon as possible without awaiting the synchronization between the revolution speeds of the internal combustion engine and the electric motor. As a result, the delay in the rise of the driving force can be avoided in advance.

According to the drive control system having a tenth featuring construction of the invention, the time period for continuously feeding the initial pressure to the clutch mechanism for coupling the internal combustion engine and the power transmission line at the time of starting its engagement is longer, when the start of the internal combustion engine and the downshift in the automatic transmission are simultaneously decided, than the remaining cases. Therefore, the timing at which the clutch mechanism substantially starts to take the transmission torque capacity is made earlier. As a result, the internal combustion engine is started earlier than when the downshift is not simultaneously decided, so that the delay in the control to raise the driving force can be avoided.

According to the drive control system having an eleventh featuring construction of the invention, the standby pressure to be fed at the engagement start control time to the clutch mechanism for coupling the internal combustion engine and the power transmission line is made higher, when the start of the internal combustion engine and the downshift in the automatic transmission are simultaneously decided, than the remaining cases. Therefore, the incomplete engagement state, in which the clutch mechanism is held standby, comes closer to the complete state. As a result, the revolution speed of the internal combustion engine is raised at an earlier timing, that is, the internal combustion engine is started earlier than when the downshift is not simultaneously decided, so that the delay in the control to raise the driving force can be avoided.

According to the drive control system having a twelfth featuring construction of the invention, when the start of the internal combustion engine and the downshift in the automatic transmission are simultaneously decided, the feed of the fuel to the internal combustion engine and the timing for the substantial outputting of the internal combustion engine are effected earlier than the remaining cases. As a result, it is possible to improve the responsibility to the demand for the driving force.

According to the drive control system having a thirteenth featuring construction of the invention, when the start of the internal combustion engine and the downshift in the automatic transmission are simultaneously decided, the clutch mechanism for inputting the torque to the internal combustion engine from the electric motor is substantially applied to have a transmission torque capacity earlier than the remaining cases because the oil pressure has a high rising gradient. As a result, the timing for raising the revolution speed of the internal combustion engine to that of the electric motor or the timing for feeding the internal combustion engine with the fuel to start it substantially is made earlier. As a result, it is possible to improve the responsibility to the demand for increasing the driving force.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The invention will be described more specifically in the following. The drive control system of the invention is a system for controlling the driving force of a hybrid vehicle which is equipped with two kinds of prime movers, i.e., an internal combustion engine and an electric motor activated to output the driving force by an electric power. Here, the internal combustion engine is, in short, a prime mover for outputting a motive power by burning a fuel and is exemplified by a gasoline engine, a Diesel engine or a gas engine employing a gas fuel such as a hydrogen gas. Moreover, the type of the internal combustion engine should not be limited to the reciprocating engine type but may be a turbine engine type. Here, the internal combustion engine will be shortly referred to as the "engine" in the following description.

On the other hand, the electric motor may be, in short, a prime mover having a function to output a motive power when activated by an electric power and is exemplified by a variety of motors such as an AC permanent magnet type synchronous motor, a DC motor, or a motor/generator having a function to generate an electric power when driven by an external force. Moreover, the electric motor can be used with a generator. Here, in an embodiment to be described herein, the electric motor is exemplified by the motor/generator.

The hybrid vehicle, to which the invention is applied, is of the type in which the internal combustion engine is started by turning it with the output of the electric motor and by feeding it with the fuel when its revolution speed reaches a predetermined level. Specifically, the hybrid vehicle is of the so-called "parallel type", in which it can be run with the individual outputs of the internal combustion engine and the electric motor by coupling both the engine and the motor to a power transmission line.

In short, this power transmission line is a mechanism for transmitting the driving force to the drive wheels and may or may not be equipped with a transmission. With this transmission, the driving force can be controlled in the power transmission line. Moreover, the transmission may be exemplified by either a manual transmission for changing a gear ratio by operating it manually or an automatic transmission in which the gear ratio is controlled according to the running state such as the vehicle speed or the engine load. Further exemplified is not only a staged transmission for changing the gear ratio stepwise but also a continuous transmission having a continuously changed gear ratio. The following embodiment employs the automatic transmission.

Figure 1:
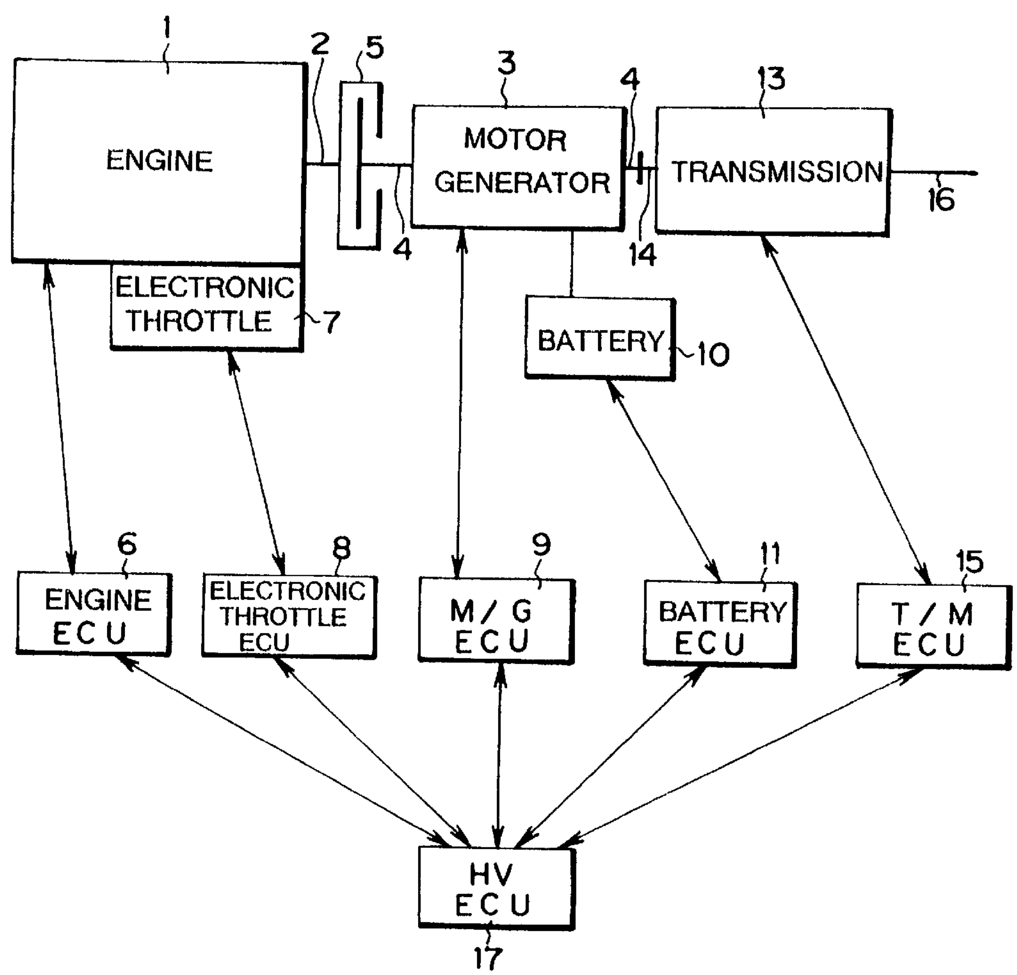
FIG. 1 is a block diagram schematically showing a hybrid drive control system according to the invention and its control lines.

FIG. 1 is a block diagram schematically showing a drive control system according to the invention. An engine 1 has an output shaft (i.e., a crankshaft) 2 connected to an output shaft 4 of a motor/generator 3 through an input clutch 5. This input clutch 5 corresponds to a clutch mechanism of the invention and acts as a connection mechanism for connecting those output shafts 2 and 4 selectively. More specifically, the input clutch 5 can be exemplified by a friction clutch of the type, in which friction discs are hydraulically brought into contact with each other to have a transmission torque capacity increased with the oil pressure supplied, and by a wet type multi-disc clutch. There is provided a (not-shown) control system for electrically controlling the feed and release of the oil pressure to and from the input clutch 5.

The engine 1 in the embodiment shown in FIG. 1 is of the type in which the ignition timing, the fuel feed rate (or fuel injection rate), the idling revolution speed and the valve timings are electrically controlled, and is equipped with an electronic control unit (or engine ECU) 6 for those controls. This electronic control unit 6 is a device constructed mainly of a microcomputer which receives data such as the intake air, the accelerator position, the engine water temperature and the engine revolution speed NE to determine and output controlled variables such as the ignition timing on the basis of the pre-stored data and programs and the received data.

On the other hand, the engine 1 is equipped with an electronic throttle valve 7 for controlling the throttle opening electrically. This electronic throttle valve 7 is controlled in its degree of opening by the extent of depression of the (not-shown) accelerator pedal and by the controlled variables which are computed on the basis of the various data such as a mode signal selected by a mode selection switch. For this control, there is provided an electronic control unit (e.g., electronic throttle ECU) 8. This electronic control unit 8 is also constructed mainly of a microcomputer.

The motor/generator 3 has a well-known structure in which a rotor integrated with the output shaft 4 is rotatably arranged in the inner circumference of a stator having a coil, for example, and which is equipped with a resolver for detecting the revolutions of the rotor. The motor/generator 3 is constructed such that the rotor is rotated back and forth by controlling the power supply to the coil while controlling the torque and such that an electromotive force is generated by rotating the rotor by an external force. In order to control this motor/generator 3, there is provided an electronic control unit (M/G-ECU) 9 which is constructed mainly of a microcomputer. To this electronic control unit 9, there are inputted control data such as the revolution speed (or motor revolution speed) NM of the motor/generator 3.

Further provided is a battery 10 for supplying an electric current to the motor/generator 3 and for reserving the electric power generated by the motor/generator 3. In order to control the discharge and charge of the battery 10, there is provided an electronic control unit (or battery ECU) 11 which is constructed mainly of a microcomputer.

To the output shaft 4 of the motor/generator 3, there is connected an input shaft 14 of a transmission 13. The embodiment, as shown in FIG. 1, adopts as the transmission 13 an electronic control type automatic transmission in which a gear ratio is controlled on the basis of the running state. Specifically, this transmission 13 is constructed to determine the gear ratio on the basis of the data such as the throttle opening, the vehicle speed, the shift pattern or the shift range and to control the (not-shown) frictional engagement unit such as clutches or brakes hydraulically so as to establish the determined gear ratio. For this hydraulic control, there is provided an electronic control unit (T/M-ECU) 15 which is constructed mainly of a microcomputer.

Moreover, this transmission 13 has an output shaft 16 connected to the wheels through the not-shown propeller shaft and axles. Therefore, the transmission 13, the propeller shaft connected thereto, and the output shaft 4 of the motor/generator 3 correspond to a power transmission line in the invention.

The individual electronic control units 6, 8, 9, 11 and 15 thus far described are so connected with a hybrid control unit (HV-ECU) 17 constructed mainly of a microcomputer, that they may transfer the data with one another. This hybrid control unit 17 is constructed to control the driving force of the hybrid vehicle by performing the synthetic controls of the application/release and the transmission torque capacity of the input clutch 5, the timing and rate of the fuel feed to the engine 1, the drive/regeneration and the output torque of the motor/generator 3, and the gear ratio of the transmission 13. In short, the hybrid control unit 17 inputs/outputs the data necessary for those controls and is equipped with the programs for processing the data.

The hybrid vehicle is a vehicle which has been developed mainly to improve the fuel economy and to clean the exhaust gas. Thus, the hybrid vehicle selects its prime movers in accordance with the running state such that it is driven at a low speed by the output of the motor, such that it is driven by the output of the engine when it runs at a constant speed higher than a predetermined level, and such that it is driven by the outputs of the engine and the motor when a higher driving force is demanded. It follows that the engine is started while the hybrid vehicle is being driven by the motor. In case the power transmission line is constructed, as shown in FIG. 1, the engine can be started by transmitting the motor torque to the engine to turn the engine.

Figure 2:
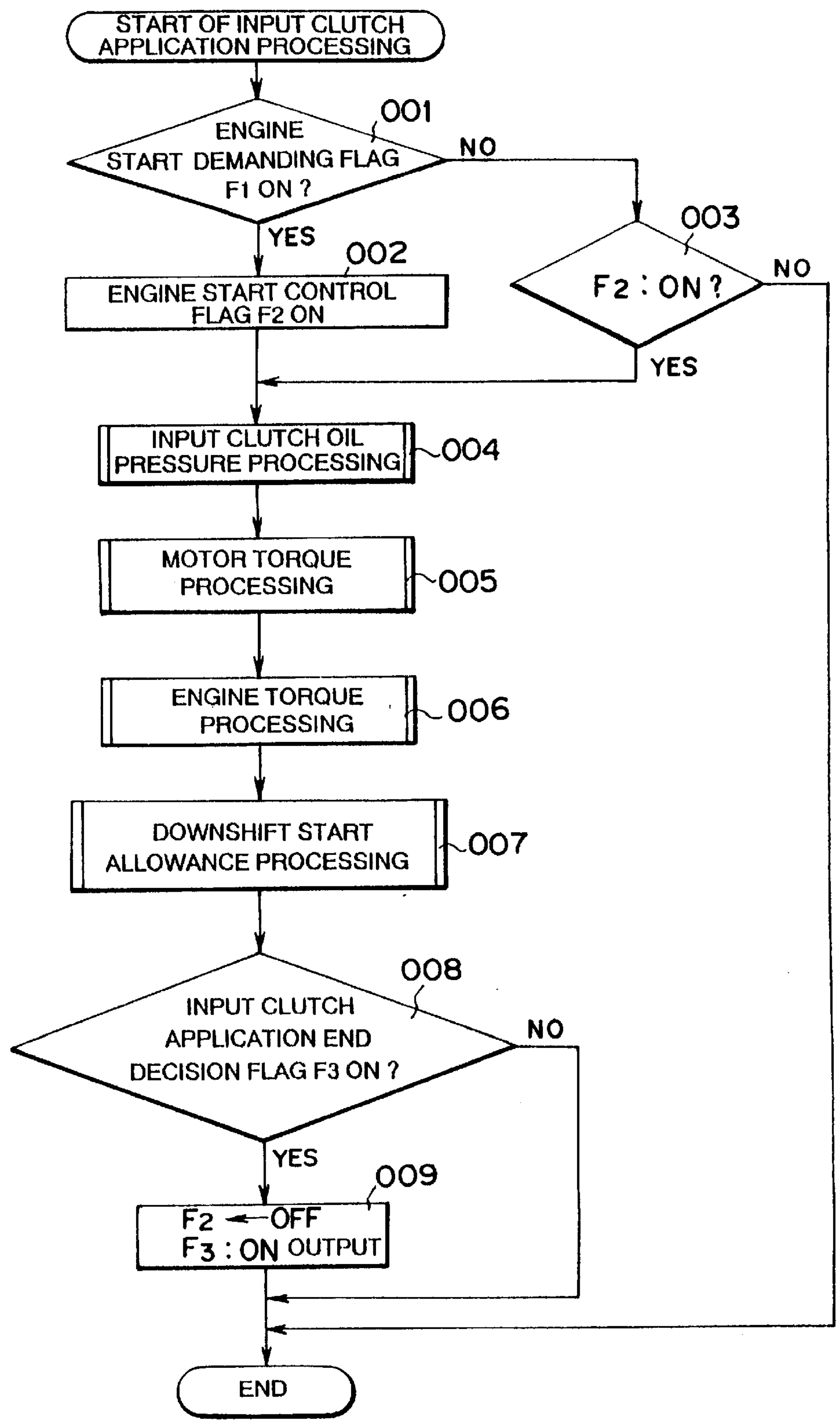
FIG. 2 is a flow chart showing an example of the control to be executed in the invention, i.e., an entire control routine for starting an internal combustion engine while the vehicle is being run with the output of an electric motor.

Thus, the drive control system according to the invention controls the start of the engine 1 in the manner to be described in the following. FIG. 2 is a flow chart showing the controls for coupling the engine 1 to the power transmission line so as to control the start of the engine 1, that is, the entire control routine for controlling the application of the input clutch 5. This routine is repeatedly executed for every several milliseconds.

At first Step 001, it is decided whether or not an engine start demanding flag F1 is ON. This start demand of the engine 1 is determined with the not-shown subroutine. Specifically, the engine start demanding flag F1 is turned ON, when the revolution speed of the motor/generator 3 reaches a predetermined level while the vehicle is being driven by the output of the motor/generator 3, when the state of charge of the battery 10 drops, or when the (not-shown) accelerator pedal is deeply depressed to demand a higher driving force while the vehicle is being driven by the motor/generator 3.

When the answer of Step 001 is YES because the engine start demanding flag F1 is ON, an engine start control flag F2 is turned ON (at Step 002). When the answer of Step 001 is NO because the engine start demanding flag F1 is OFF, on the contrary, it is decided (at Step 003) whether or not the engine start control flag F2 is ON. When both the engine start demanding flag F1 and the engine start control flag F2 are OFF because the engine start is not demanded yet, the answer of Step 003 is NO, and this routine is ended. When the decision of Step 001 is made again after the engine start control flag F2 was already turned ON, on the other hand, the answer is NO because the engine start demanding flag F1 has been switched to OFF. Since the engine start control flag F2 has been already ON, however, the answer of Step 003 is YES.

After the engine start control flag F2 is turned ON at Step 002 or when the answer of Step 003 is YES, the routine advances to an oil pressure processing of the input clutch 5 (at Step 004), a motor torque processing (at Step 005), an engine torque processing (at Step 006) and a downshift start allowance processing (at Step 007). These individual processings of Step 004 to Step 007 will be described hereinafter.

Next, it is decided (at Step 008) whether or not a flag F3 for deciding the application end of the input clutch 5 is ON. Since the input clutch 5 is one for coupling the engine 1 to the power transmission line, the complete application of the input clutch 5 can be decided from the fact that the engine 1 is brought into a rotation continuing state by the feed of the fuel or that the engine 1 accordingly begins lowering the torque of the motor/generator 3. When the answer of this Step 008 is NO, that is, when the application of the input clutch 5 is not ended, this routine skips to continue the processings of Step 004 to Step 007. When the answer of Step 008 is YES because the application of the input clutch 5 is ended, on the contrary, the processing for applying the input clutch 5 is ended (at Step 009) by switching the engine start control flag F2 to OFF and by outputting the ON signal of the application end decision flag F3.

Figure 3:
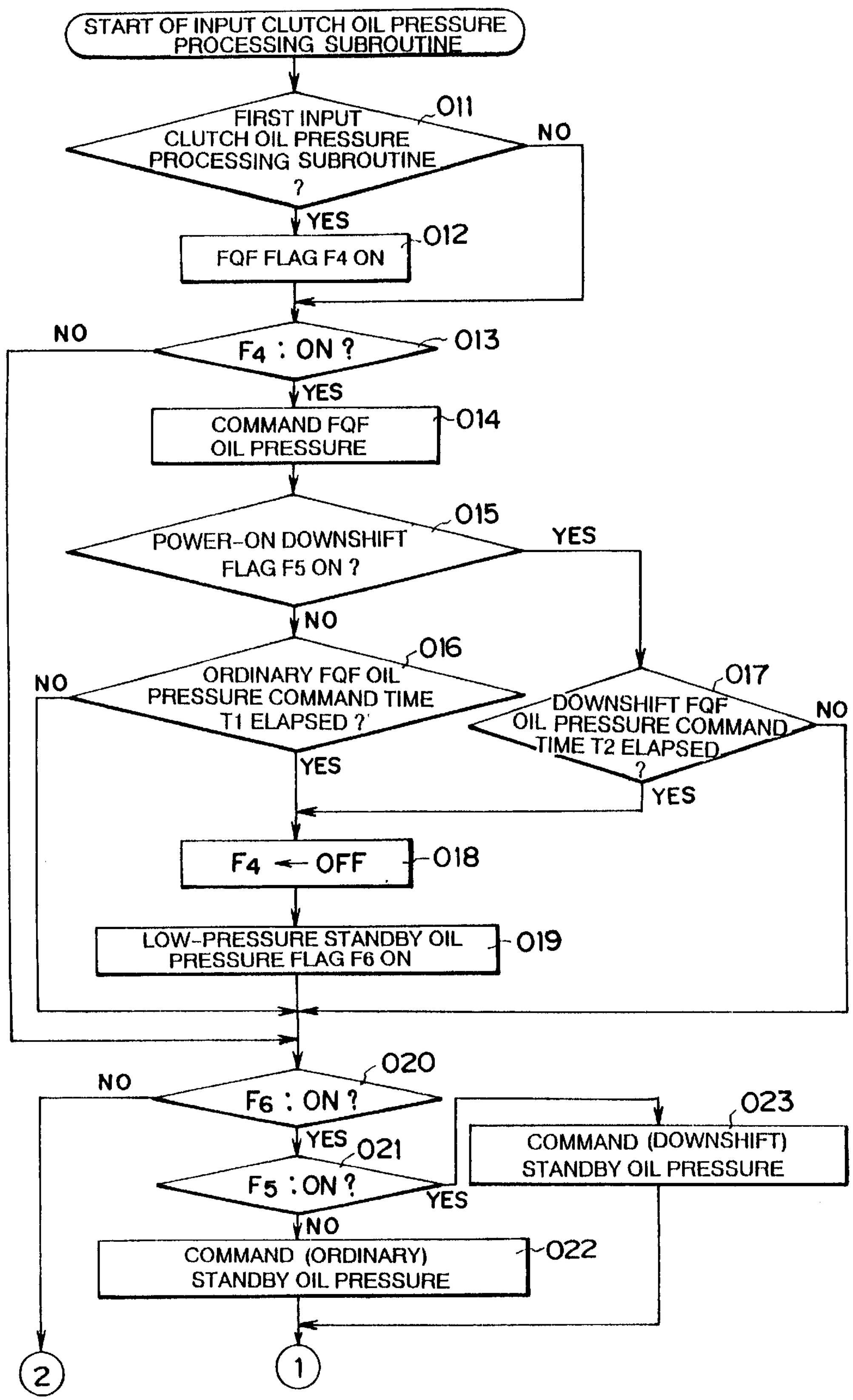
FIG. 3 is a flow chart showing an example of the control to be executed in the invention, i.e., a portion of a subroutine for processing the oil pressure of an input clutch.
Figure 4:
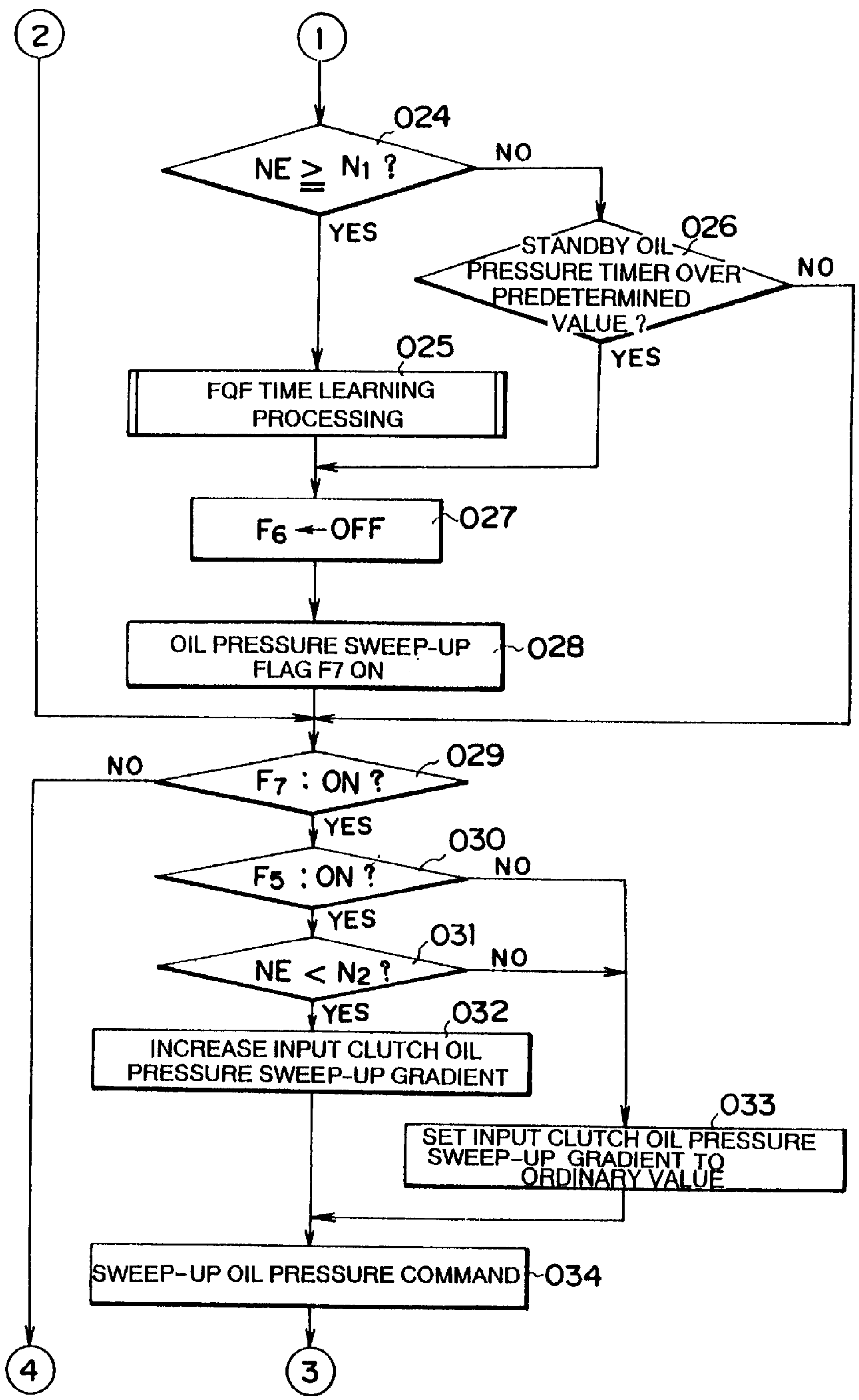
FIG. 4 is a flow chart showing an example of the control to be executed in the invention, i.e., another portion of the subroutine.
Figure 5:
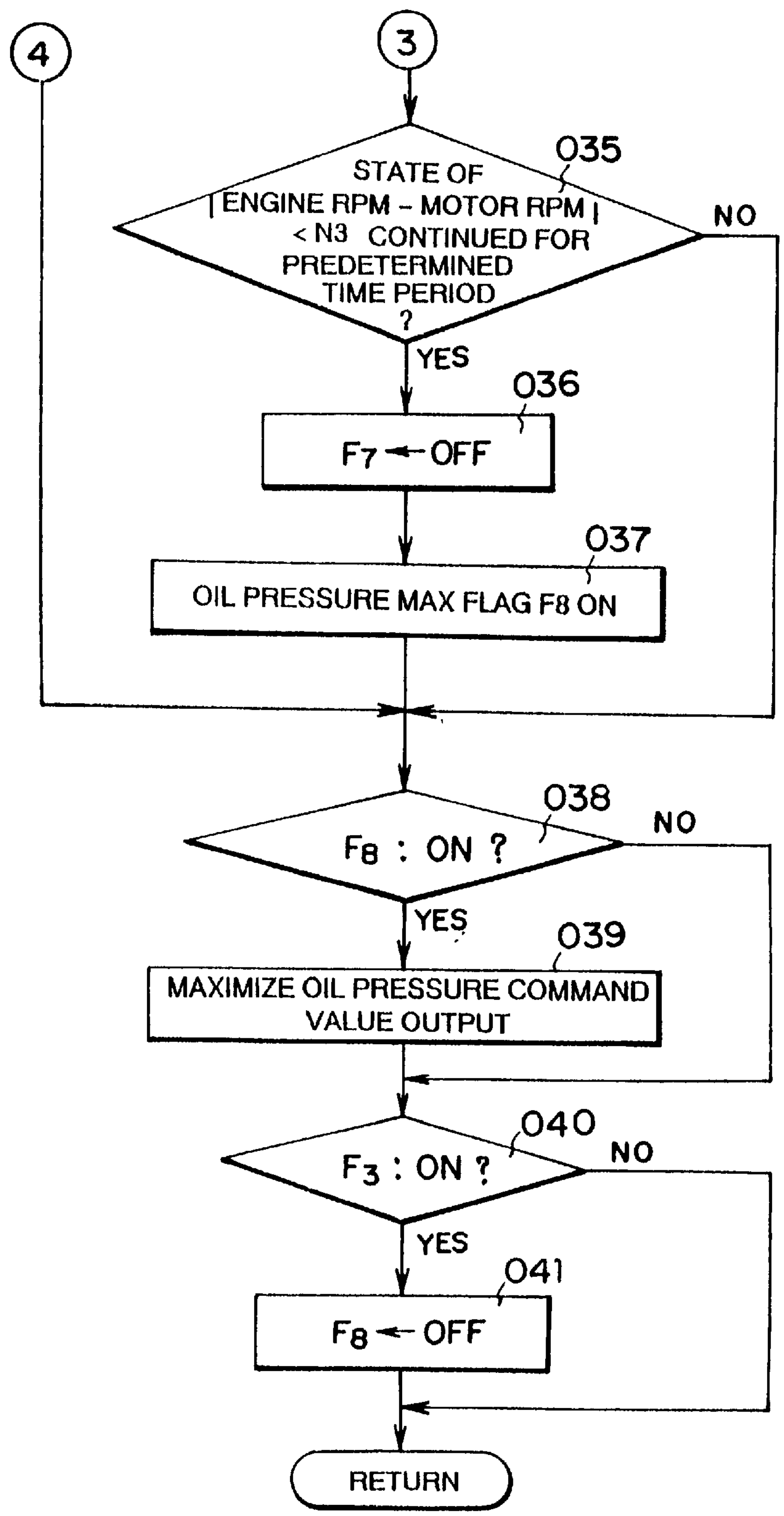
FIG. 5 is a flow chart showing an example of the control to be executed in the invention, i.e., still another portion of the subroutine.

In response to a demand, if any, for starting the engine 1, the input clutch 5 is applied to couple the engine 1 to the power transmission line to rotate the engine 1 by the motor torque. In order to prevent the shock due to an abrupt change in the driving force, the oil pressure of the input clutch 5 is controlled in the following manners. FIGS. 3 to 5 show a subroutine for the oil pressure processing of the input clutch to be interrupted at Step 004.

This subroutine is repeatedly executed at an interval of several milliseconds in accordance with the execution of the routine shown in FIG. 1. At Step 011, therefore, it is decided whether or not the execution of this subroutine is for the first time. The answer of this Step 011 is YES, when the oil pressure processing for applying the input clutch 5 is started, but the answer of Step 011 is NO when the oil pressure processing for applying the input clutch 5 was already started, because the execution of the routine shown in FIGS. 3 to 5 is at the second or later time.

When the answer of Step 011 is YES, a fast/quick/fill flag (or FQF flag) F4 is turned ON (at Step 012), and the routine advances to Step 013. When the answer of Step 011 is NO because the processing of the oil pressure of the input clutch 5 has been already started, on the contrary, the routine instantly advances to Step 013.

Here, the FQF flag F4 is one to be set ON for the time period from the instant when the feed of the initial oil pressure (or the FQF oil pressure) for applying the input clutch 5 is started to the instant when the feed control is ended. Moreover, this feed control of the initial oil pressure is one for feeding the oil pressure at a preset high level as the initial oil pressure so as to immediately plug the clearance between the (not-shown) friction discs of the input clutch 5 and the clearance between the (not-shown) piston and the friction disc. At Step 013, it is decided whether or not the FQF flag F4 is ON, so as to determine the start or end of the feed control of this initial oil pressure.

The answer of Step 013 is YES if the FQF flag F4 is ON, because the application start of the input clutch 5 is decided. Then, the output of the fast/quick/fill oil pressure (i.e., the FQF oil pressure) is commanded (at Step 014) as the initial oil pressure. As the means for controlling the oil pressure of the input clutch 5, there can be used an electrically controllable valve such as a duty solenoid valve (or a linear solenoid valve). When this solenoid valve is employed, the control of Step 014 is to raise a command signal temporarily. This command signal takes a predetermined value. Here, this command signal need not be fixed but may take such a value (or a variable) as set as a map value in accordance with the condition such as the oil temperature.

Next, it is decided (at Step 015) whether or not a power-on downshift flag F5 is ON. Specifically, this flag F5 is ON when the accelerator pedal is depressed to hold the decision of the downshift. The control of the flag F5 is performed by the automatic transmission electronic control unit 15. When this flag F5 is OFF so that the answer of Step 015 is NO, it is decided (at Step 016) whether or not the feed time period (or the command time period) T1 of the initial oil pressure at the ordinary time has elapsed. When the answer of Step 015 is YES because the downshift is decided, on the contrary, it is decided (at Step 017) whether or not the feed time period (or the command time period) T1' of the initial oil pressure for the downshift has elapsed. These command time periods T1 and T1' are those for continuously outputting the command signal to feed the initial oil pressure, and the command time period T1 for the ordinary time is set shorter than the command time period T1' for the downshift (i.e., T1<T1'). In short, the time period for feeding the initial oil pressure becomes longer when the downshift is decided.

When the answer of Step 016 or Step 017 is YES, that is, when the time period for feeding the initial oil pressure has elapsed, the FQF flag F4 is turned OFF (at Step 018), and a low-pressure standby oil pressure flag F6 is turned ON (at Step 019). When the command time periods T1 and T1' do not elapse so that the answer of Step 016 or Step 017 is NO, on the contrary, the routine skips over Step 018 and Step 019 to Step 020. In short, the feed control of the initial oil pressure (i.e., the FQF oil pressure) is continued.

Even when the FQF flag F4 is OFF so that the answer of Step 013 is NO, on the other hand, the routine advances to Step 020. In this case, the operations of Step 014 to Step 019 are not executed because the feed of the initial oil pressure is ended.

At Step 020, it is decided whether or not the low-pressure standby oil pressure flag F6 is ON. This flag F6 is kept ON while the input clutch 5 is kept standby in an incomplete applied state after the feed of the initial oil pressure is ended. Therefore, the answer of Step 020 is YES while the oil pressure to be fed to the input clutch 5 is controlled to keep the input clutch 5 in the incomplete applied state, but the answer of Step 020 is NO after the low-pressure standby control is ended.

When the low-pressure standby oil pressure flag F6 is turned ON so that the answer of Step 020 is YES, it is decided (at Step 021) whether or not the power-on downshift flag F5 is ON. The decision of this Step 021 is made like the aforementioned decision of Step 015. When the answer of Step 021 is NO, a command signal for setting the standby oil pressure for the ordinary operation is outputted (at Step 022). When the answer of Step 021 is YES, on the contrary, a command signal for setting the standby oil pressure for the downshift is outputted (at Step 023).

Here, the standby oil pressure is required for holding the input clutch 5 standby in the incomplete applied state after the initial oil pressure was fed to the input clutch 5. In this incomplete applied state, moreover, the transmission torque capacity is slightly lower than the loaded torque so that the rotational change on the output side will not occur, or the oil pressure slightly rises so that the transmission torque capacity exceeds the load torque to cause a rotational change on the output side. Moreover, the downshift standby oil pressure is set higher than the standby oil pressure for the ordinary operation. When the downshift is decided, therefore, the input clutch 5 takes a state closer to the complete applied state. Here, the command value of this low-pressure standby oil pressure is specifically made by outputting a pulse signal to a duty solenoid valve (or a linear solenoid valve) acting as the oil pressure control means. Moreover, the command signal may differ between the ordinary operation and the downshift and according to the oil temperature.

After the control of the standby oil pressure was started, as described above, it is decided (at Step 024) whether or not the engine revolution speed NE reaches a predetermined reference revolution speed N1. This reference revolution speed N1 is a small value near zero, and it is, therefore, decided at Step 024 whether or not the engine 1 has started its rotation. When the engine 1 starts its rotation so that the answer of Step 024 is YES, the learning control of the feed time period (or the FQF time period) of the initial oil pressure is executed (at Step 025). This learning control will be described hereinafter. Subsequent to this learning control, moreover, the low-pressure standby oil pressure flag F6 is turned OFF (at Step 027), and an oil pressure sweep-up flag F7 is turned ON (at Step 028).

When the engine 1 does not start its rotation so that the answer of Step 024 is NO, it is decided (at Step 026) whether or not the counted value of the standby oil pressure timer exceeds a predetermined reference value. This is a control of the so-called “guard timer” for preventing the standby oil pressure control from continuing for a time period more than necessary. When the answer of Step 026 is YES, therefore, the routine instantly advances to Step 027, at which the standby oil pressure control ends. When the answer of Step 026 is NO, on the contrary, the standby oil pressure control should be continued so that the routine skips to Step 029 over Step 027 and Step 028. Here, the routine instantly advances to Step 029, even when the low-pressure standby oil pressure flag F6 is OFF so that the answer of Step 020 is NO. This is because the low-pressure standby control has ended.

Here will be described the learning control of the FQF time period. As described hereinbefore, the initial oil pressure is fed to reduce the clearance (or the pack clearance) in the input clutch 5 to restore the state just before the engagement start. The pack clearance is not fully reduced if the feed time period of the initial oil pressure is short. If the feed time period of the initial oil pressure is long, on the contrary, the input clutch 5 is prematurely applied to start the rotation of the engine 1 excessively earlier. Therefore, the feed time period (or the FQF time period) of the initial oil pressure is elongated or shortened to set a proper value on the basis of the time period from the instant of the feed end of the initial oil pressure to the start of the rotation of the engine 1.

Figure 6:
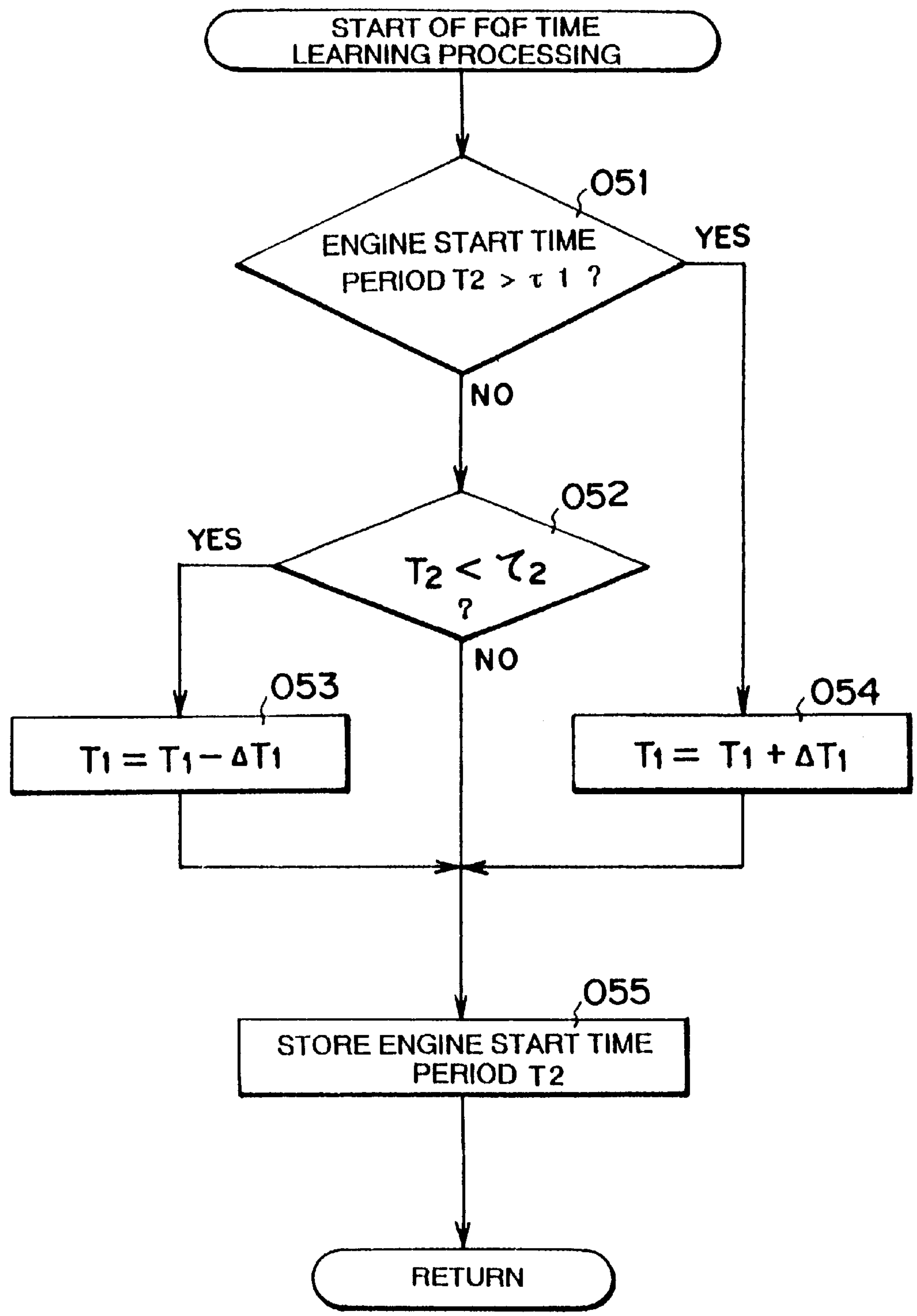
FIG. 6 is a flow chart showing an example of the control to be executed in the invention, i.e., a learning control routine of a feed time period of an initial oil pressure.

The control will be specified with reference to FIG. 6. FIG. 6 shows a subroutine for learning the FQF time period. It is decided (at Step 051) whether or not an engine start time period T2, i.e. the time period from the instant when the FQF flag F4 is turned OFF at Step 018 to the instant when the revolution speed NE of the engine 1 exceeds the reference revolution speed N1 so that the answer of Step 024 is YES exceeds a preset reference value $\tau 1$. When the engine start time period T2 is not longer than the reference value $\tau 1$ so that the answer of Step 051 is NO, the routine advances to Step 052, at which it is decided whether or not the engine start time period T2 is shorter than a second reference value $\tau 2$. Here, this second reference time period $\tau 2$ is shorter than the first reference time period $\tau 1$ (that is, $\tau 1 > \tau 2$).

When the engine start time period T2 is shorter than the second reference value $\tau 2$, the timing for the engine 1 to start its rotation is too premature. This is because the feed time period (or the FQF time period) T1 of the initial oil pressure (or the FQF oil pressure) is so long that the initial oil pressure is excessively fed to the input clutch 5 to advance the engagement. When the answer of Step 052 is YES, therefore, a predetermined value $\Delta$T1 is subtracted from the FQF time period T1 to shorten the FQF time period T1, as decided at Step 016 (at Step 053). In short, the feed time period of the next initial oil pressure is shortened to bring the input clutch 5 close to the released state.

When the engine start time period T2 is longer than the first reference value $\tau 1$ so that the answer of Step 051 is YES, on the contrary, a sufficient torque is not transmitted to the engine 1 through the input clutch 5. In this case, therefore, the predetermined value $\Delta$T1 is added to the FQF time period T1 to elongate the FQF time period T1 to be decided at Step 016 (at Step 054). In short, the feed time period of the next initial oil pressure is elongated to bring the input clutch 5 close to the applied state. Here, when the engine start time period T2 is proper between the reference values $\tau 1$ and $\tau 2$, the FQF time period T1 is not changed, but the detected engine start time period T2 is stored as it is (at Step 055), and the routine is then returned. With the control of Step 053 or Step 054, on the other hand, the routine advances to Step 055, at which the engine start time period T2 is stored.

Here will be described the sweep-up control of the oil pressure of the input clutch 5. This is a control for raising the engine revolution speed NE smoothly by raising the oil pressure of the input clutch 5 gradually. This sweep-up control is started when it is detected that the engine 1 has started its rotation after the control of the standby oil pressure was started. As shown in FIG. 4, more specifically, it is decided (at Step 029) whether or not the oil pressure sweep-up flag F7 is ON. When the oil pressure sweep-up control is started, the answer of Step 029 is YES. When the oil pressure sweep-up control is not started or was already ended, on the contrary, the answer of Step 029 is NO.

When the sweep-up control for gradually raising the oil pressure of the input clutch 5 is started so that the answer of Step 029 is YES, it is decided (at Step 030) whether or not the power-on downshift flag F5 is ON. The operation of Step 030 is similar to the decision step of Step 015 or Step 021. When the downshift is decided so that the answer of Step 030 is YES, it is decided (at Step 031) whether or not the engine revolution speed NE is lower than a predetermined reference value N2. This reference value N2 is as high as the idling revolution speed, for example. When the answer of Step 031 is YES, therefore, the engine revolution speed NE is low although an increase in the driving force by the downshift is demanded. In order to raise the engine revolution speed NE to a target value for a short time period, therefore, the sweep-up gradient of the oil pressure of the input clutch 5 is increased (at Step 032). Here, the control to increase the sweep-up gradient may be continued till the engine revolution speed NE comes into synchronism with the motor revolution speed NM.

On the contrary, when the power-on downshift is not decided so that the answer of Step 030 is NO or when the engine revolution speed NE exceeds the reference revolution speed N2 even with the decision of the power-on downshift so that the answer of Step 031 is NO, the sweep-up gradient of the oil pressure of the input clutch 5 is set to an ordinary value smaller than that to be set at Step 032 (at Step 033). Here, the ordinary sweep-up gradient to be set at Step 033 is predetermined neither to establish a delay feeling of the engine start control nor to cause a reduction in the driving force, as might otherwise be invited by raising the engine revolution speed abruptly. Therefore, the gradient of the sweep-up is increased, because of the decision of the downshift, till the engine revolution speed NE reaches the aforementioned reference value N2.

After the sweep-up gradient is set at Step 032 or Step 033, the oil pressure command value of the input clutch 5 is swept up according to the set gradient (at Step 034). Specifically, the duty ratio for controlling the oil pressure of the input clutch 5 is gradually increased or decreased. When the oil pressure of the input clutch 5 is swept up, the torque to be transmitted from the motor/generator 3 to the engine 1 gradually rises so that the revolution speed NE of the engine 1 gradually comes close to the revolution speed of the motor/generator 3.

At Step 035 subsequent to Step 034, therefore, it is decided whether or not the state in which the absolute value of the difference between the engine revolution speed (Revolution Per Minutes) NE and the revolution speed (RPM) NM of the motor/generator 3 is smaller than a reference value N3 continues for a predetermined time period. This reference value N3 is relatively small. At Step 035, therefore, it is decided whether or not the engine revolution speed NE comes into substantial synchronism with the revolution speed (or the motor revolution speed) NM of the motor/generator 3.

When the engine revolution speed NE synchronizes with the motor revolution speed NM so that the answer of Step 035 is YES, the oil pressure sweep-up flag F7 is turned OFF (at Step 036), and an oil pressure maximum flag F8 is turned ON (at Step 037). In short, the sweep-up control of the oil pressure of the input clutch 5 is ended, and the control for setting the oil pressure to the maximum is started.

On the contrary, when the engine revolution speed NE is lower by more than the reference value N3 than the motor revolution speed NM or when the engine revolution speed NE is substantially equal to the motor revolution speed NM but this state does not continue, the answer of Step 035 is NO. In this case, the routine skips over Step 036 and Step 037 to Step 038. In short, the sweep-up control of the oil pressure is continued. When the oil pressure sweep-up flag F7 is OFF so that the answer of Step 029 is NO, on the other hand, the routine instantly advances to Step 038 because the sweep-up control itself of the oil pressure is not executed.

At Step 038, it is decided whether or not the oil pressure maximum flag F8 is ON. This flag F8 is turned ON when the sweep-up control of the oil pressure of the input clutch 5 is ended and turned OFF in the other case, that is, when the oil pressure sweep-up control is continued or when the control to maximize the oil pressure is ended. When the sweep-up control of the oil pressure is ended so that the oil pressure maximum flag F8 is ON, the answer of Step 038 is YES. In this case, the control to maximize the oil pressure of the input clutch 5 is executed (at Step 039). In short, the control command of the oil pressure of the input clutch 5 is maximized. Specifically, the duty ratio of the command signal is maximized or minimized to raise the oil pressure of the input clutch 5 to the line pressure. Here, when the oil pressure maximum flag F8 is OFF so that the answer of Step 038 is NO, the routine skips over Step 039 to Step 040, and the preceding control is continued.

Next, at Step 040, it is decided whether or not the flag F3 for deciding the application end of the input clutch 5 is ON. When this flag F3 is not ON, the control to maximize the oil pressure command value is continued. When the decision flag F3 of the application end of the input clutch 5 is ON so that the answer of Step 040 is YES, on the contrary, the oil pressure maximum flag F8 is turned OFF (at Step 041), and the routine is then returned.

Figure 7A:
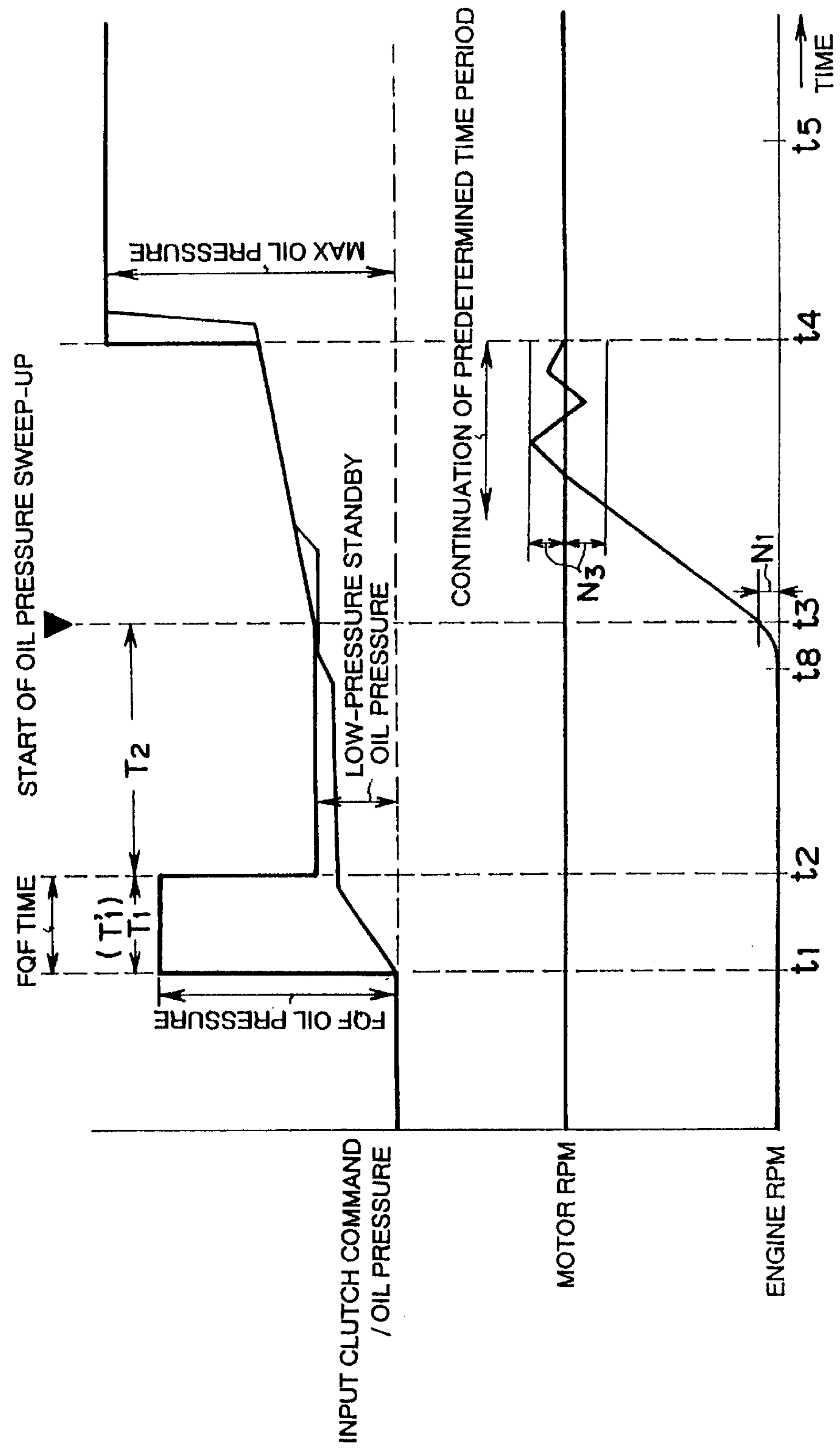
FIG. 7A is a time chart showing changes in the oil pressure and the revolution speeds when the control shown in FIG. 2 is executed.
Figure 7B:
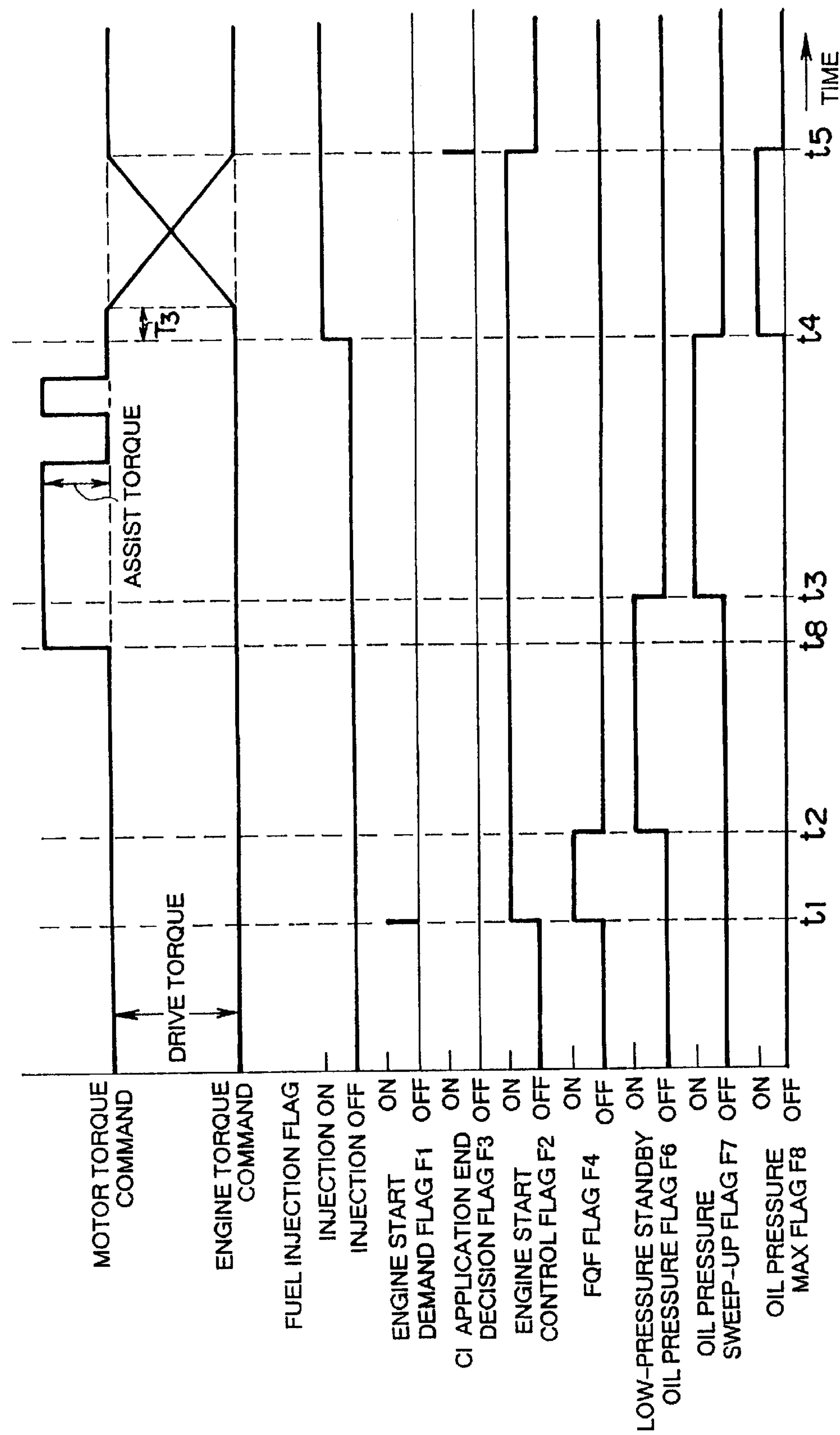
FIG. 7B is a time chart showing changes in the commands and the flags when the control shown in FIG. 2 is executed.

A time chart for executing the controls thus far described is shown in FIGS. 7A and 7B. Simultaneously as the engine start demand flag F1 is turned ON at time t1, the engine start control flag F2 and the FQF flag F4 are turned ON. Then, a command value to control the oil pressure of the input clutch 5 to the initial value (or the FQF oil pressure) is outputted, and this control is continued for the predetermined FQF time period T1. By performing this initial oil pressure control, the oil pressure of the input clutch 5 is raised, as shown by a thin solid curve in FIG. 7A, to reach a pressure corresponding to the standby oil pressure.

At instant t2 after the lapse of the FQF time period T1, the FQF flag F4 is turned OFF, and the low-pressure standby oil pressure flag F6 is turned ON. At this instant, the control value of the oil pressure of the input clutch 5 is set to a level corresponding to the standby oil pressure, and its command value is kept. In this state, the input clutch 5 is in an incomplete applied state although it is transmitting the torque, so that the revolution speed (RPM) NE of the engine 1 is not instantly increased. During this control keeping the low-pressure standby oil pressure, the output torque of the motor/generator 3 is raised, as will be described hereinafter, so that the engine 1 starts its rotation. This is decided, as has been described hereinbefore, from the fact that the engine revolution speed NE exceeds the reference value N1 near zero.

At instant t3 when the decision holds, the low-pressure standby oil pressure flag F6 is turned OFF, but the oil pressure sweep-up flag F7 is turned ON. Then, the sweep-up control of the oil pressure of the input clutch 5 is started. In short, the oil pressure command value is swept up. Specifically, the application oil pressure of the input clutch 5 gradually rises to increase the torque for rotating the engine 1 so that the engine revolution speed NE gradually rises. As a result, when the state in which the difference between the engine revolution speed NE and the motor revolution speed NM is within the predetermined reference value N3 continues for a predetermined time period, it is decided that the engine revolution speed NE is synchronized with the motor revolution speed (RPM) NM. At this instant t4, the oil pressure sweep-up flag F7 is turned OFF, but the oil pressure maximum flag F8 is turned ON. Accordingly, the oil pressure of the input clutch 5 is raised to the line pressure (i.e., the original pressure of the entire oil pressure system).

After this, the prime mover for the running is switched from the motor/generator 3 to the engine 1, and the application end flag F3 is turned ON simultaneously with the end of the control. At this instant t5, the engine start control flag F2 and the oil pressure maximum flag F8 are turned OFF.

Figure 8A:
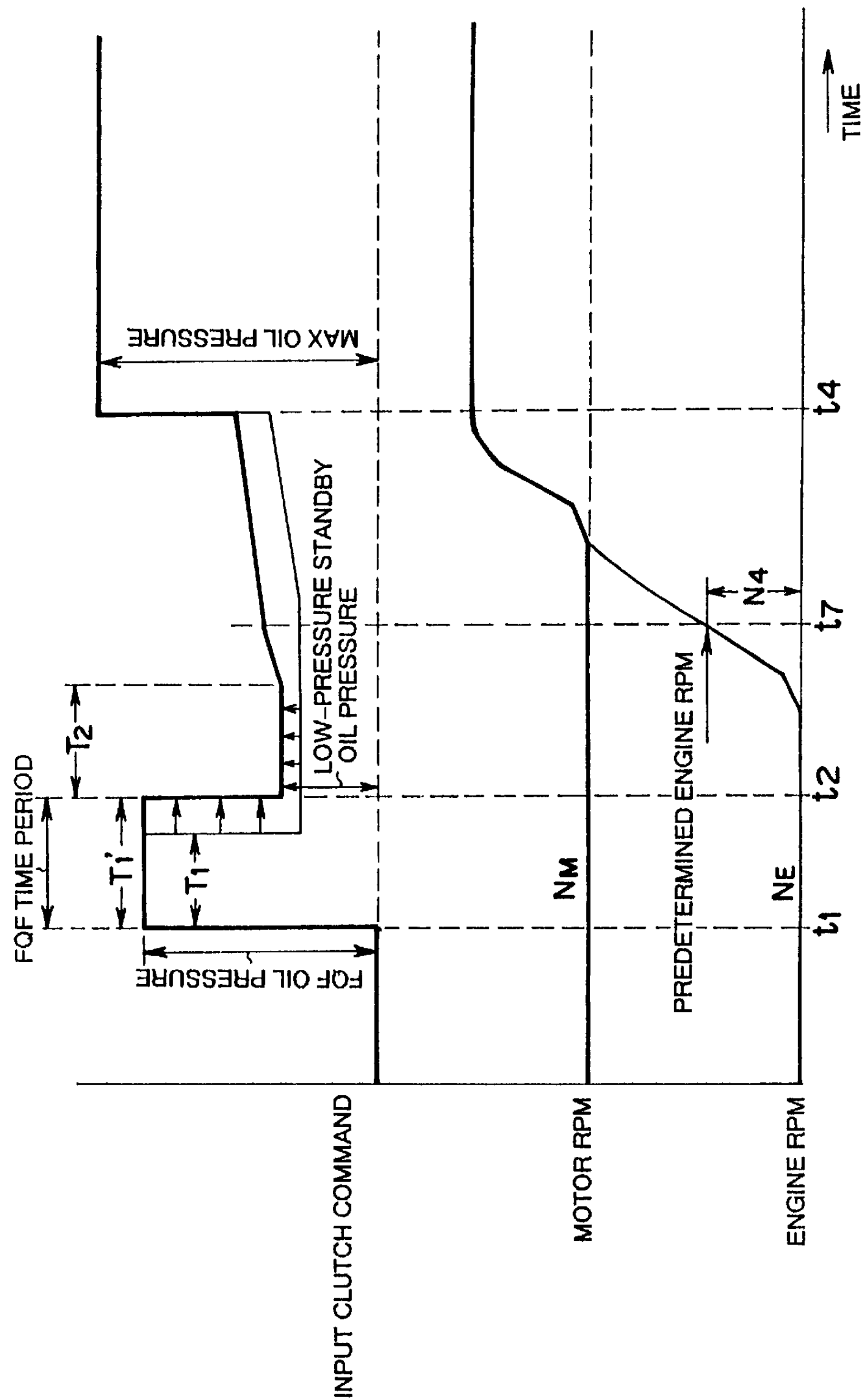
FIG. 8A is a time chart showing an example of the control to be executed in the invention, i.e., the case in which a power-on downshift is demanded.
Figure 8B:
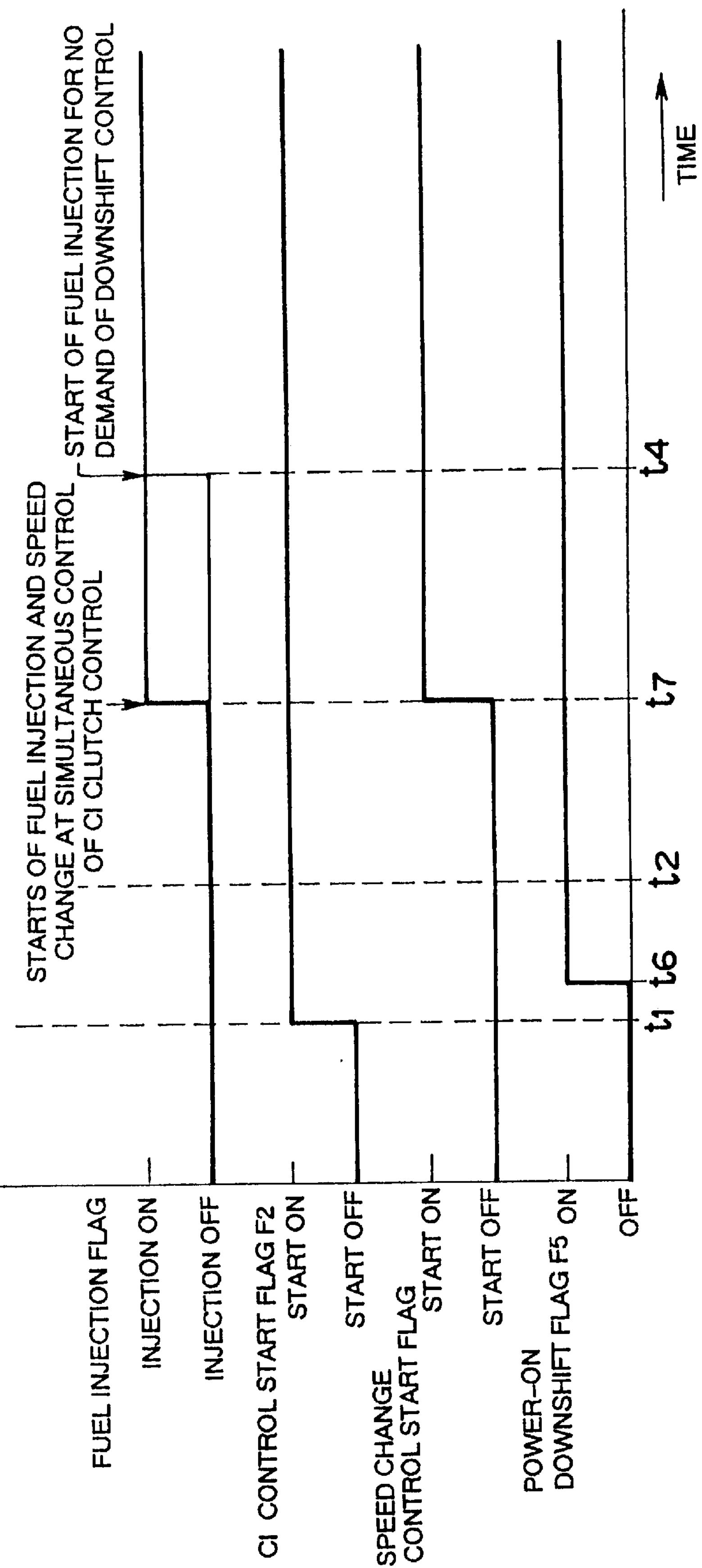
FIG. 8B is a time chart showing an example of the control to be executed in the invention, i.e., the case in which a power-on downshift is demanded.

On the other hand, a time chart for the case in which the decision of the power-on downshift holds is shown in FIGS. 8A and 8B. If the accelerator pedal is deeply depressed, for example, at instant t6 when a predetermined time period was elapsed from the instant t1 when the engine start control flag F2 had been turned ON by a demand for the engine start, to turn ON the power-on downshift flag F5, as shown in FIGS. 8A and 8B, the downshift FQF time period T1' is selected as the feed control time period of the initial oil pressure in place of the FQF time period T1 for the ordinary operation. Moreover, the standby oil pressure is set to a level higher than the ordinary pressure. Of the solid curves indicating the input clutch command value of FIG. 8A, the thick solid curve indicates the command value at the downshift time, and the thin solid curve indicates the command value at the ordinary time. Since the downshift is demanded, moreover, the sweep-up gradient of the oil pressure of the input clutch 5 is increased more than that of the ordinary time. In the example shown in FIG. 8A, the sweep-up gradient is increased till instant t7 at which the engine revolution speed (RPM) NE is increased to an extent.

When the downshift is demanded, therefore, the feed time period (or the FQF time period) T1' of the initial oil pressure is elongated so that the input clutch 5 is controlled to a state more approximate to the applied state than that for the ordinary operation. Since the low-pressure standby oil pressure is higher than that at the ordinary time, moreover, the transmission torque capacity of the input clutch 5 is increased. As a result, the engine 1 starts to rotate earlier than the ordinary time because a high torque is transmitted to the engine 1. After this, the sweep-up gradient of the oil pressure of the input clutch 5 is set to a higher value than that of the ordinary time so that the torque to be transmitted to the engine 1 is increased earlier than that of the ordinary time. In short, the revolution speed of the engine 1 is quickly increased to achieve earlier the synchronization of the engine revolution speed NE with the motor revolution speed (RPM) NM and the start of the engine 1. Accordingly, the run by the engine 1 can be early effected to achieve the control meeting the demand for the increase in the driving force.

Figure 9:
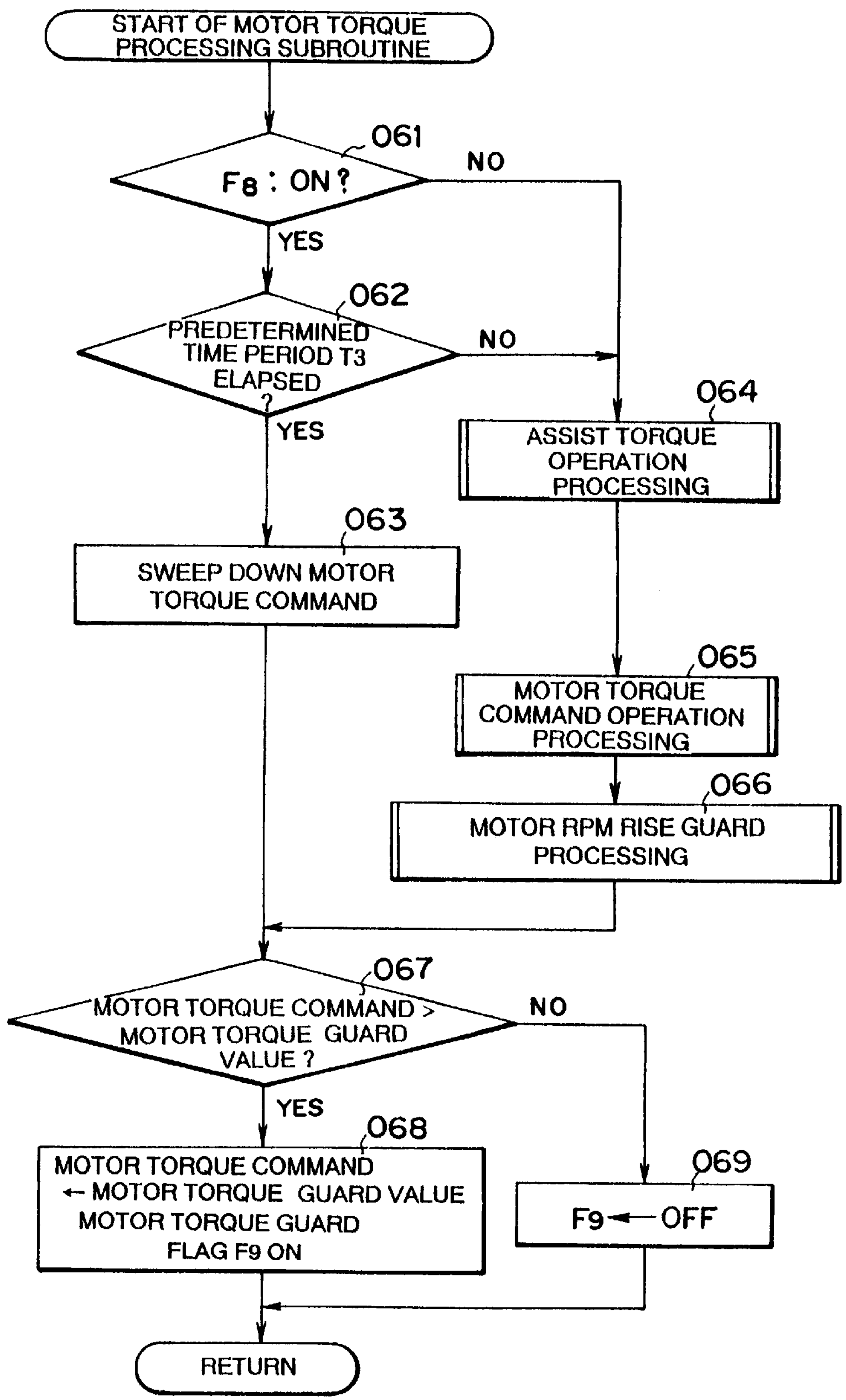
FIG. 9 is a flow chart showing an example of the control to be executed in the invention, i.e., a motor torque processing subroutine.

Here will be described the processing of the motor torque to be executed at Step 005. This is a control for preventing the shock due to the change in the driving force and the delay in the start of the engine 1, and includes the torque control of the motor/generator 3 for rotating the engine 1 and the control of reducing the torque of the motor/generator 3 gradually after the end of the start of the engine 1. Specifically, FIG. 9 is a flow chart showing the motor torque processing subroutine. First of all, it is decided (at Step 061) whether or not the oil pressure maximum flag F8 is ON. As described hereinbefore, this oil pressure maximum flag F8 is turned ON when the engine revolution speed NE is synchronized with the motor revolution speed NM. When this flag F8 is ON, therefore, the substantial start of the engine 1 is ended so that the engine 1 rotates by its own output to output the torque. When the oil pressure maximum flag F8 is OFF, on the contrary, the engine revolution speed NE is not synchronized with the motor revolution speed NM yet.

When the oil pressure maximum flag F8 is ON so that the answer of Step 061 is YES, it is decided (at Step 062) whether or not a preset time period T3 has elapsed after the oil pressure maximum flag F8 was turned ON. This time period T3 is required for the rotation of the engine 1 to stabilize after the engine revolution speed NE was synchronized with the motor revolution speed NM so that the engine 1 was fed with the fuel to start its rotation. Therefore, Step 062 is a decision process for deciding that the engine revolution speed NE is stabilized. The stable state of the engine revolution speed NE may be decided not from the lapse of the time period but from the detected value of the engine revolution speed NE.

When the answer of Step 062 is YES, the rotation of the engine 1 is stabilized. In this case, therefore, the motor torque command value is swept down (at Step 063) to lower the output torque of the motor/generator 3 gradually. This is a control for switching the run from one by the motor/generator 3 to one by the engine 1, as will be described hereinafter.

When the oil pressure maximum flag F8 is OFF so that the answer of Step 061 is NO, on the contrary, an assist torque operation is processed (at Step 064) by the motor/generator 3, a motor torque command operation is processed (at Step 065), and a motor revolution speed (RPM) rise guard is processed (at Step 066). When the engine 1 is started while the vehicle is being run by the motive force of the motor/generator 3, the motor/generator 3 is loaded with the torque for rotating the engine 1. This torque, as required for the start by rotating the engine 1, is the assist torque, which is computed at Step 064.

Figure 10:
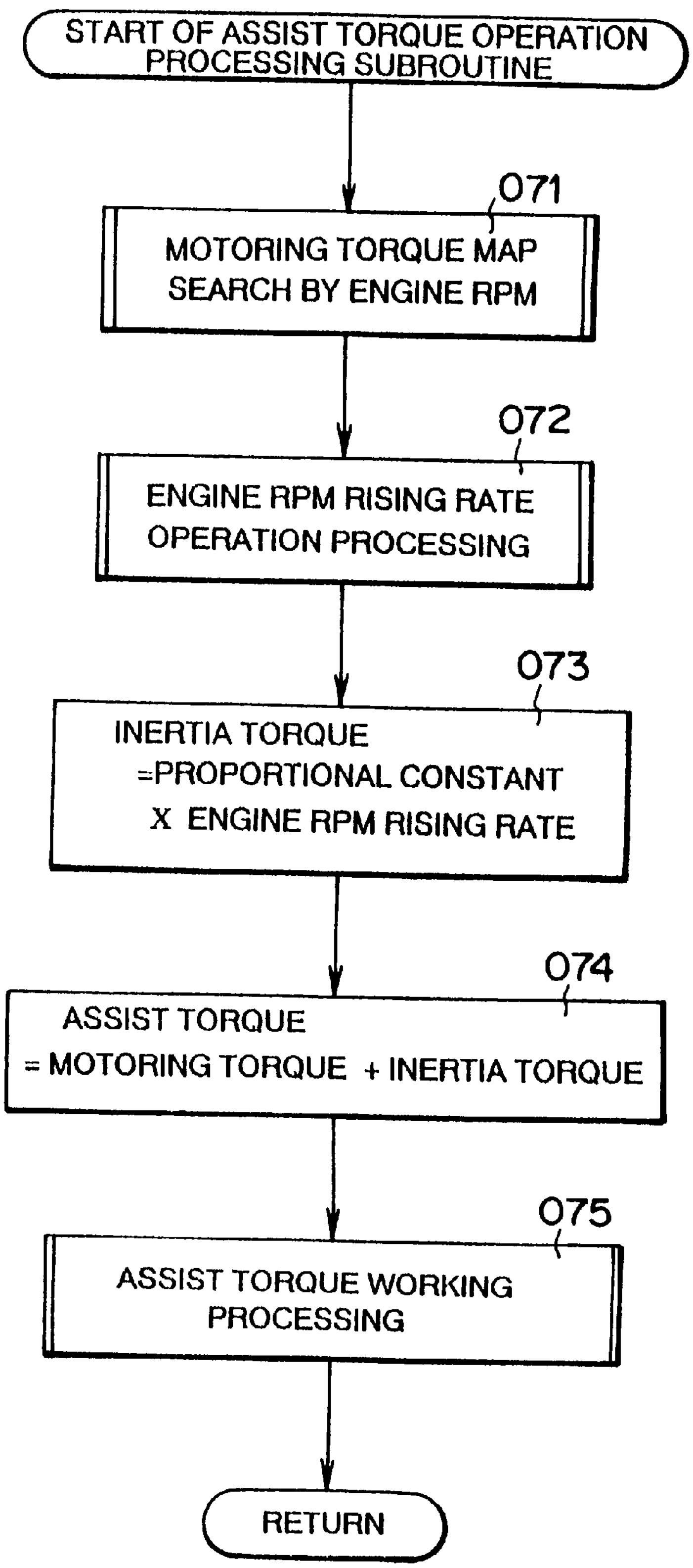
FIG. 10 is a flow chart showing an example of the control to be executed in the invention, i.e., an assist torque operation processing subroutine.

FIG. 10 is a flow chart showing a subroutine of the assist torque operation. First of all, a motoring torque is determined (at Step 071). This motoring torque is required for rotating the engine 1 and is determined according to the structure and size of the engine 1 and the revolution speed for rotating the engine 1. In the example, as shown in FIG. 10, the motoring torque is determined in the form of a map using the engine revolution speed NE as a parameter so that the motoring torque is determined by searching the map on the basis of the target engine revolution speed (RPM) NE.

Next, the rising rate of the engine revolution speed (RPM) NE is computed (at Step 072). This rising rate is computed on the basis of the change in the engine revolution speed NE, as caused when the motoring torque determined at Step 071 is added to the output torque of the motor/generator 3. Specifically, the engine revolution speed NE is detected at an interval of a constant time period so that the engine revolution speed rising rate is computed on the basis of the difference and ratio between the previous detected value and the present detected value. An inertia torque is computed by multiplying the engine revolution speed rising rate thus determined by a proportional constant (at Step 073). In order to raise the engine revolution speed NE to the target value, there are required the motoring torque and the inertia torque for causing the rotational change. Therefore, the assist torque is determined by adding the motoring torque thus determined to the inertia torque (at Step 074).

When the assist torque is to be added to the output torque of the motor/generator 3, the assist torque is worked (at Step 075) so as to prevent an abrupt change in the torque. The subroutine of this assist torque working processing is shown in a flow chart of FIG. 11. This assist torque working processing is a transient control at the time of raising the output torque of the motor/generator 3 so that it is executed when the assist torque is zero or more. Specifically, it is decided at Step 081 whether or not the assist torque is over zero. When the assist torque is below zero so that the answer of Step 081 is NO, the routine is returned. When the assist torque is over zero so that the answer of Step 081 is YES, on the contrary, it is decided (at Step 082) whether or not the assist torque working processing, as started at this time, is at first.

When the answer of Step 082 is YES, the assist counter is cleared (at Step 083) to start the counting newly. When the answer of Step 081 is NO, on the contrary, the counting by the assist counter has been already started. In this case, therefore, the routine advances to Step 084, at which a count-up is performed by the assist counter.

Next, it is decided (at Step 085) whether or not the counted value of the assist counter is smaller than a predetermined value. Here, this predetermined value is a value dividing the assist torque equally. In other words, the predetermined value is the frequency for increasing the torque separately a plurality of times to a final assist torque. At subsequent Step 086, therefore, the present target assist torque is determined by multiplying the ratio between the predetermined value and the counted value of the assist counter by the assist counter determined at Step 074. When the predetermined value is designated by "n", the first target assist torque is (1/n) of the final assist torque determined at Step 074. At the second time, the target assist torque is the (2/n) of the final assist torque. At the final n-th time, the target assist torque is the (n/n) of the final assist torque.

When the counted value of the assist counter is caused to reach the aforementioned predetermined value by performing the controls of Step 081 to Step 086 a plurality of times, the answer of Step 085 is NO, and the routine is returned without the control of the Step 086. As a result, the assist torque can be gradually increased.

Figure 12:
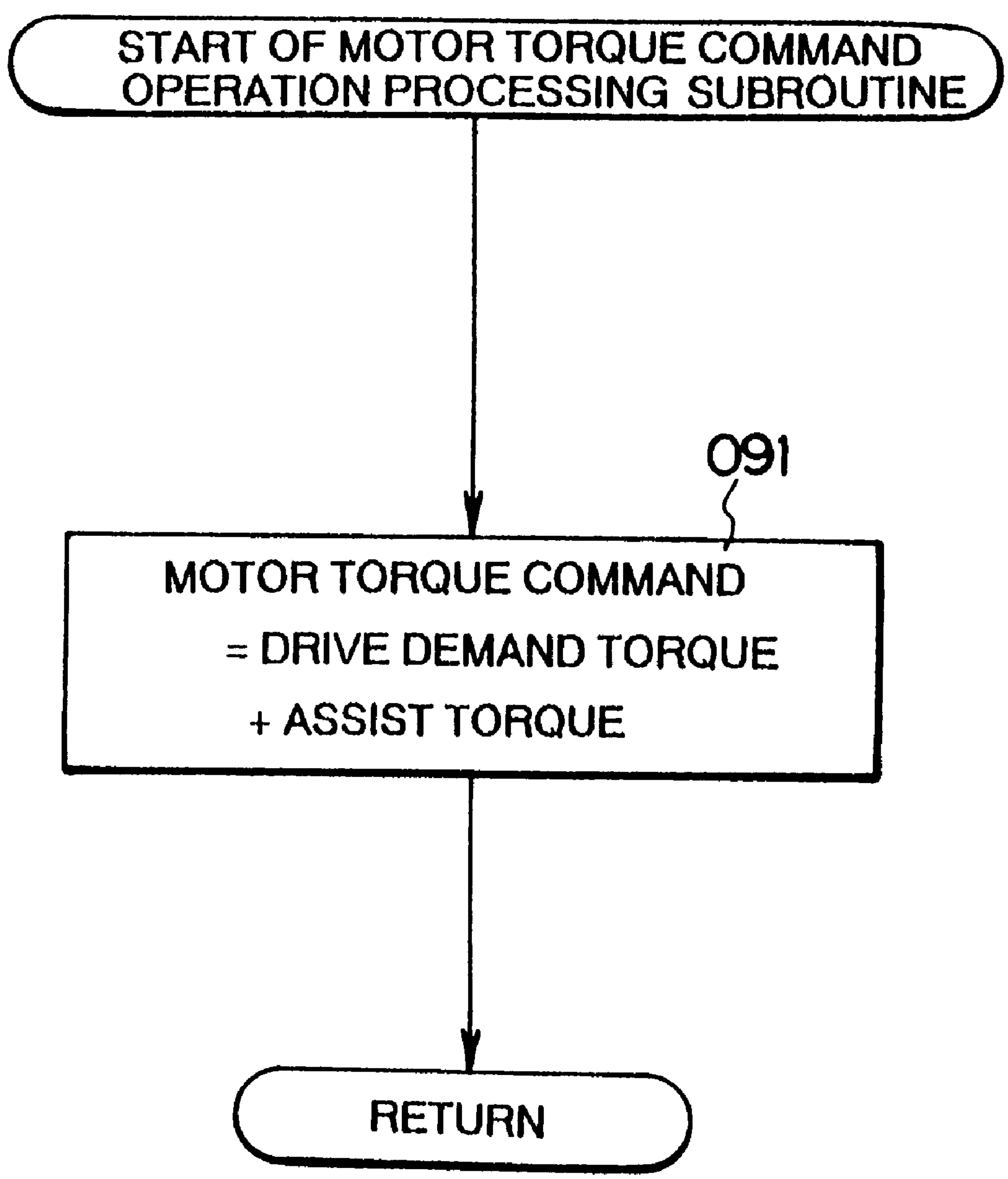
FIG. 12 is a flow chart showing an example of the control to be executed in the invention, i.e., a motor torque command operation processing subroutine.

In order to rotate and start the engine 1, the torque, to which the assist torque is added, has to be outputted by the motor/generator 3. The torque control of the motor/generator 3 is performed by the motor torque command operation processing of Step 065. FIG. 12 shows a motor torque command operation processing subroutine. When the assist torque is determined, as described hereinbefore, it is added to the drive demand torque for the run at that time so that the sum is outputted as the motor torque command value (at Step 091). Specifically, the current value to the motor/generator 3 is controlled by the M/G-ECU 9 and/or the battery ECU 11.

The assist torque thus far described is based on the motoring torque determined from the map and the inertia torque determined from the changing rate of the engine revolution speed NE at that time. At an actual running time, however, the output torque of the motor/generator 3 may become short due to the running state or the state of the engine 1. This situation may appear as a reduction in the engine revolution speed NE or may be physically felt as the deceleration. In this case, therefore, the motor torque command is increased. The foregoing Step 066 is a control step for the increase, and this specific content is shown in FIG. 13.

Figure 13:
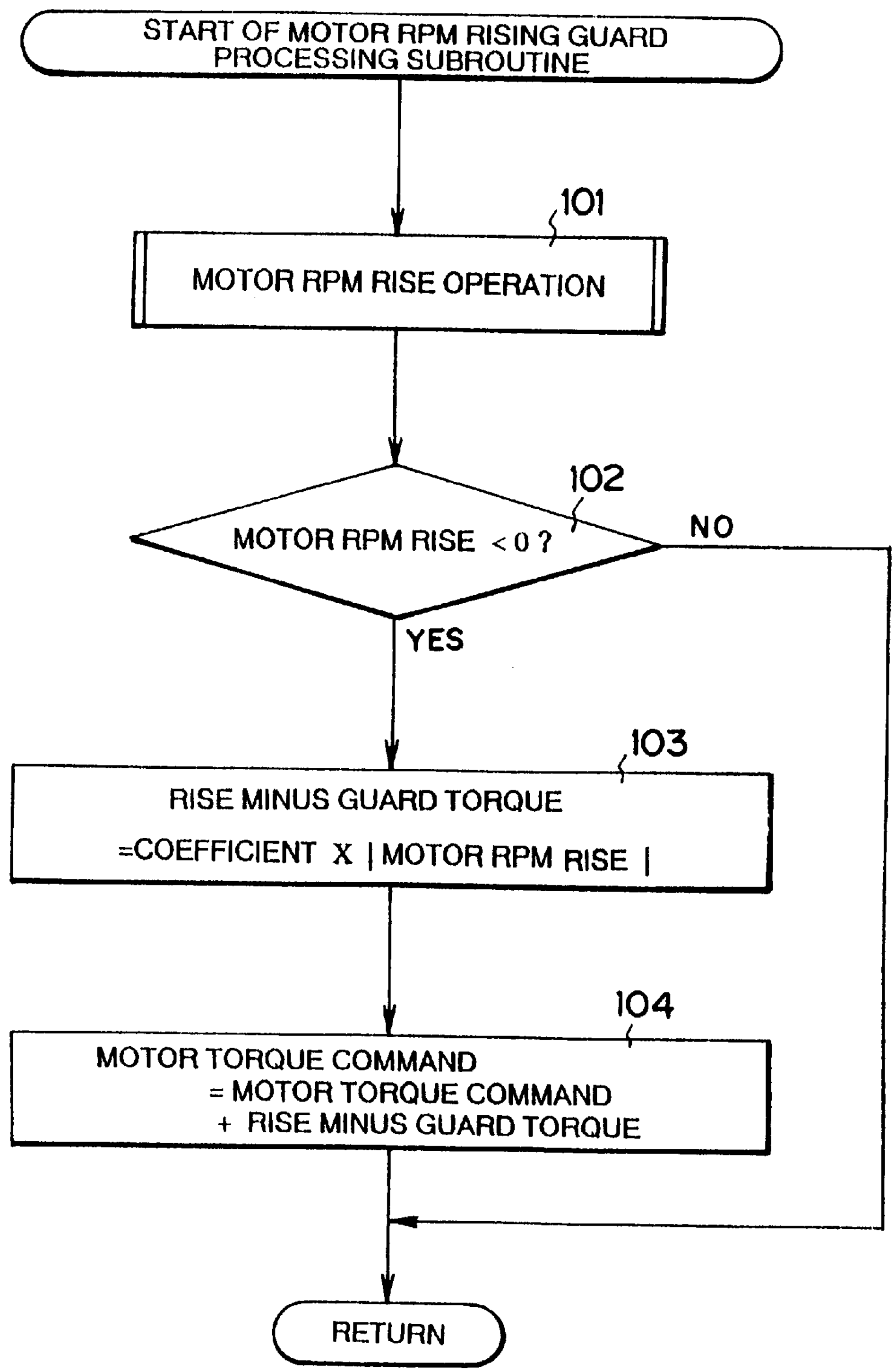
FIG. 13 is a flow chart showing an example of the control to be execute in the invention, i.e., a motor revolution speed rise guard processing subroutine.

FIG. 13 shows a subroutine for the rising guard processing of the motor revolution speed. At first Step 101, the rise in the motor revolution speed (RPM) NM is computed. This rise can be determined by monitoring the motor revolution speed NM which is inputted to the M/G-ECU 9. Next, it is decided (at Step 102) whether or not the rise in the motor revolution speed NM is negative. When the answer of Step 102 is NO, the motor revolution speed NM is not lowered, and the routine is returned without any control.

When the answer of Step 102 is YES, on the contrary, the motor revolution speed NM is lowered, and the rise minus guard torque is determined by multiplying the absolute value of the computed motor revolution speed rise by a coefficient (at Step 103). Here, this coefficient takes a numerical value for substituting the absolute value of the motor revolution speed rise (i.e., the reduction or reducing rate of the motor revolution speed) into a torque required for preventing the reduction in the motor revolution speed, and is preset on the basis of experiments or the like. The rise minus guard torque thus determined is added to the motor torque command value to determine a new motor torque command value (at Step 104). Thus, the increase in the torque is proportional to the reduction rate of the motor revolution speed NM.

Here, the processings of the assist torque at the foregoing Step 064 to Step 066 are continued till the engine revolution speed NE is stabilized, even if the oil pressure maximum flag F8 is turned ON. In other words, when the answer of Step 062 is NO, the routine advances to Step 064, at which the assist torque is processed.

The motor torque command, as determined at the foregoing Step 063 or Step 066, is determined by the computations based on the state of the rotation of the engine 1 and may exceed the torque which can be actually outputted by the motor/generator 3. Subsequent to the control of the aforementioned Step 063 or Step 066, therefore, the following controls are executed. Specifically, it is decided (at Step 067) whether or not the motor torque command value, as determined at Step 063 or Step 066, exceeds the motor torque guard value. This motor torque guard value is the upper limit value of the torque, which can be actually outputted by the motor/generator 3.

When the motor torque command value is over the motor torque guard value, therefore, this motor torque guard value is adopted as the motor torque command value, and a motor torque guard flag F9 is turned ON (at Step 068). When the motor torque command value is below the motor torque guard value so that the answer of Step 067 is NO, on the contrary, the routine advances to Step 069, at which the motor torque guard flag F9 is turned OFF.

Figure 14:
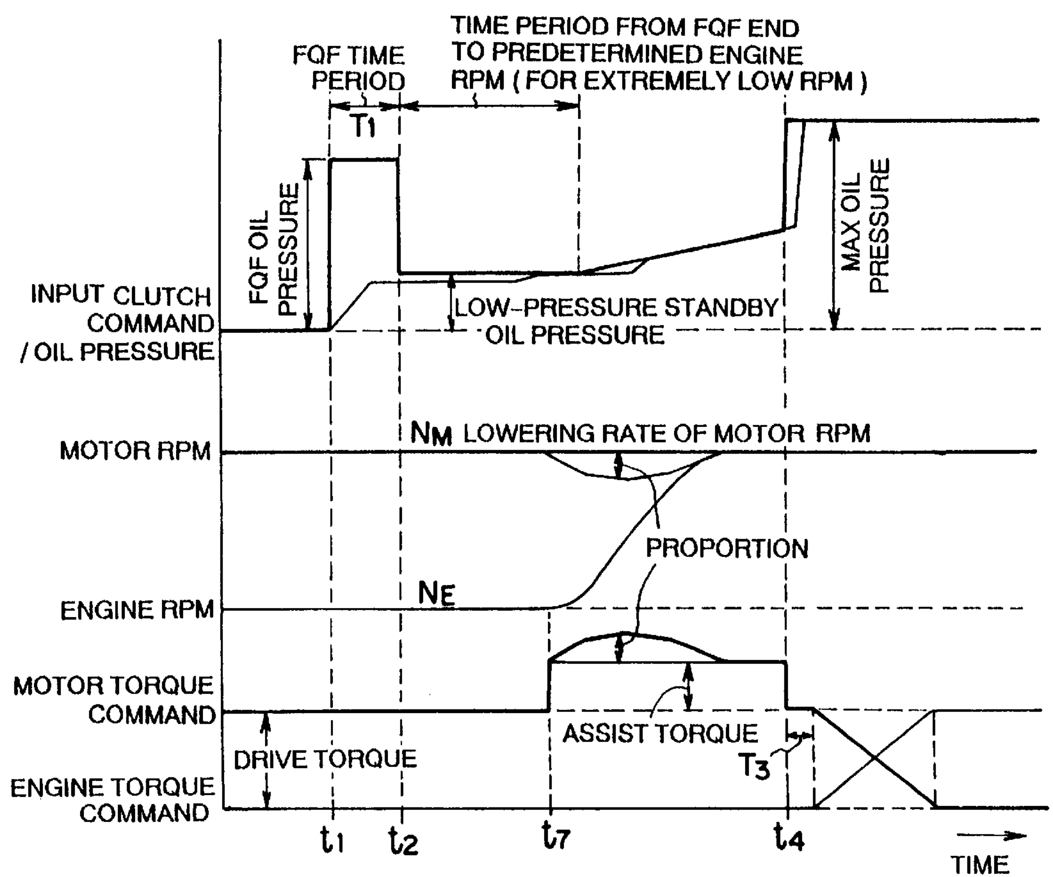
FIG. 14 is a time chart showing an example of the control to be executed in the invention, i.e., changes in a motor torque command in the case of control in which the assist torque is increased as the motor RPM lowers.
Figure 15:
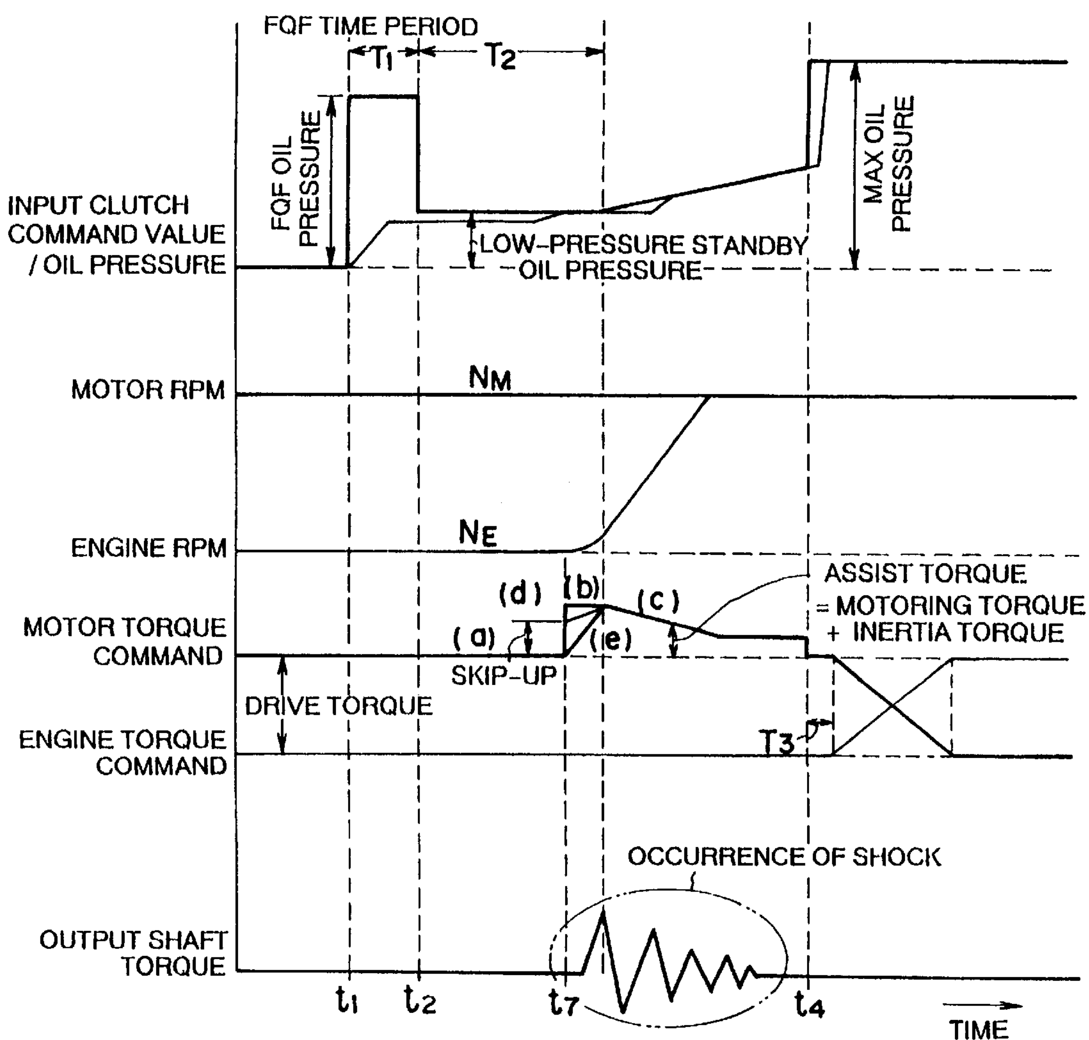
FIG. 15 is a time chart showing an example of the control to be executed in the invention, i.e., changes in the motor torque command in the case where the torque working processing is executed when the assist torque is added to a driving torque.

The changes in the motor torque command, as based on the aforementioned assist torque, are shown in FIG. 7, FIG. 14 and FIG. 15. As shown in FIG. 7, more specifically, the motor torque command value is basically set to the summed torque of the driving torque and the assist torque. Moreover, the command value is outputted at instant t8 after the engine start control flag F2 was turned ON. This control is based on the foregoing Step 091. By thus adding the assist torque to the driving torque, the engine 1 can be rotated without lowering the driving force for the run thereby to prevent the reduction in the driving force at the start of rotating the engine 1 and the shock due to the reduction.

Moreover, one example of the change in the motor torque command in the case of the aforementioned motor revolution speed (RPM) rise guard processing is shown in FIG. 14. As the motor revolution speed NM grows lower, the torque, as computed by multiplying the reduction rate by the coefficient, is added to the assist torque. As a result, the motor torque command changes, as indicated by a thick solid curve in FIG. 14. As a result, the revolution speed (RPM) of the engine 1 can be continuously raised to prevent the delay in the engine start and the delay in the increase in the driving force for the run.

Figure 11:
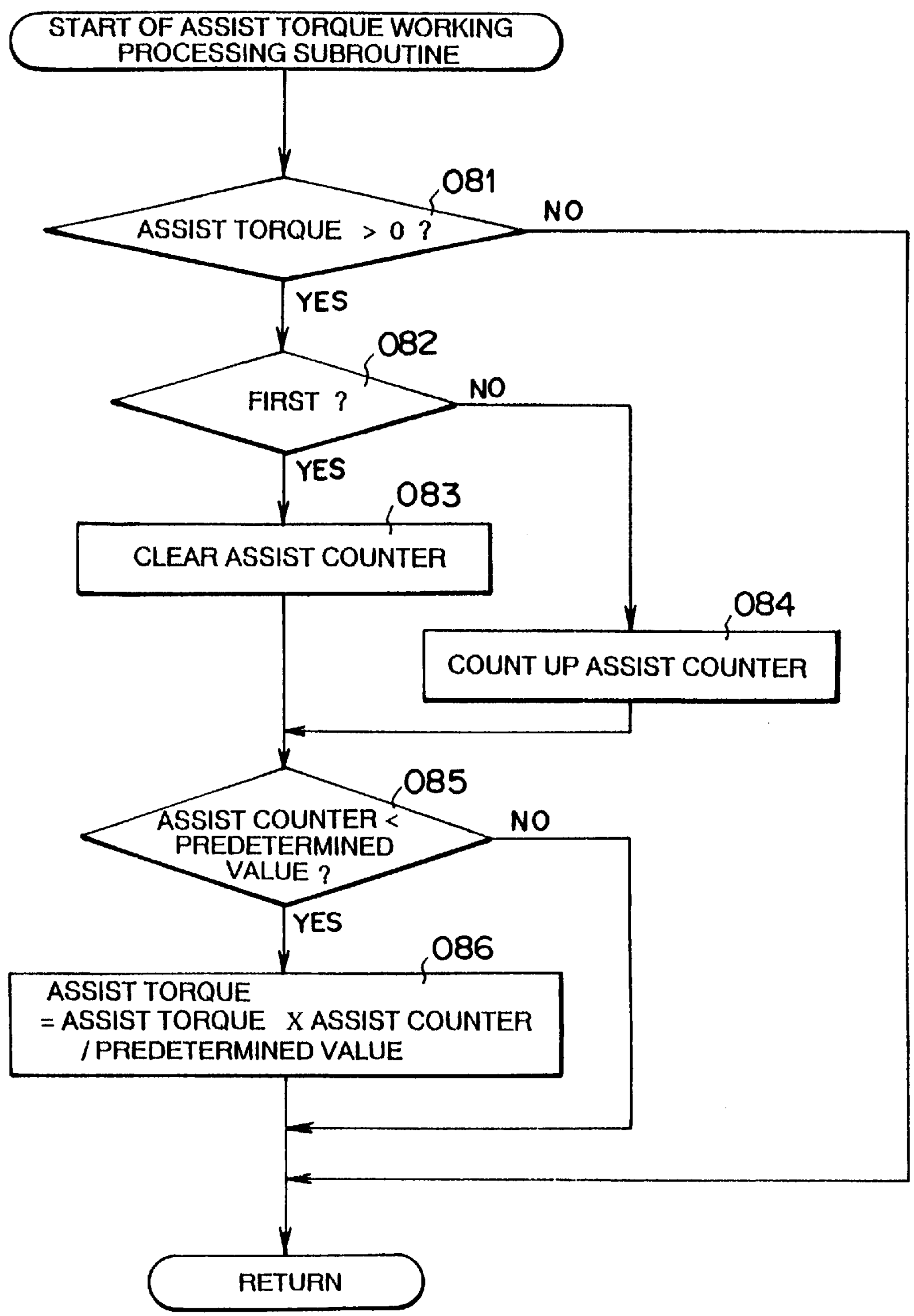
FIG. 11 is a flow chart showing an example of the control to be executed in the invention, i.e., an assist torque working processing subroutine.

By performing the control according to the routine shown in FIG. 11, moreover, the motor torque command in the case where the motor torque command according to the assist torque is outputted is changed with a predetermined gradient, as indicated by a curve of (a)–(b)–(c) of FIG. 15. In short, the motor torque is not abruptly changed so that the shock is effectively prevented.

Figure 16:
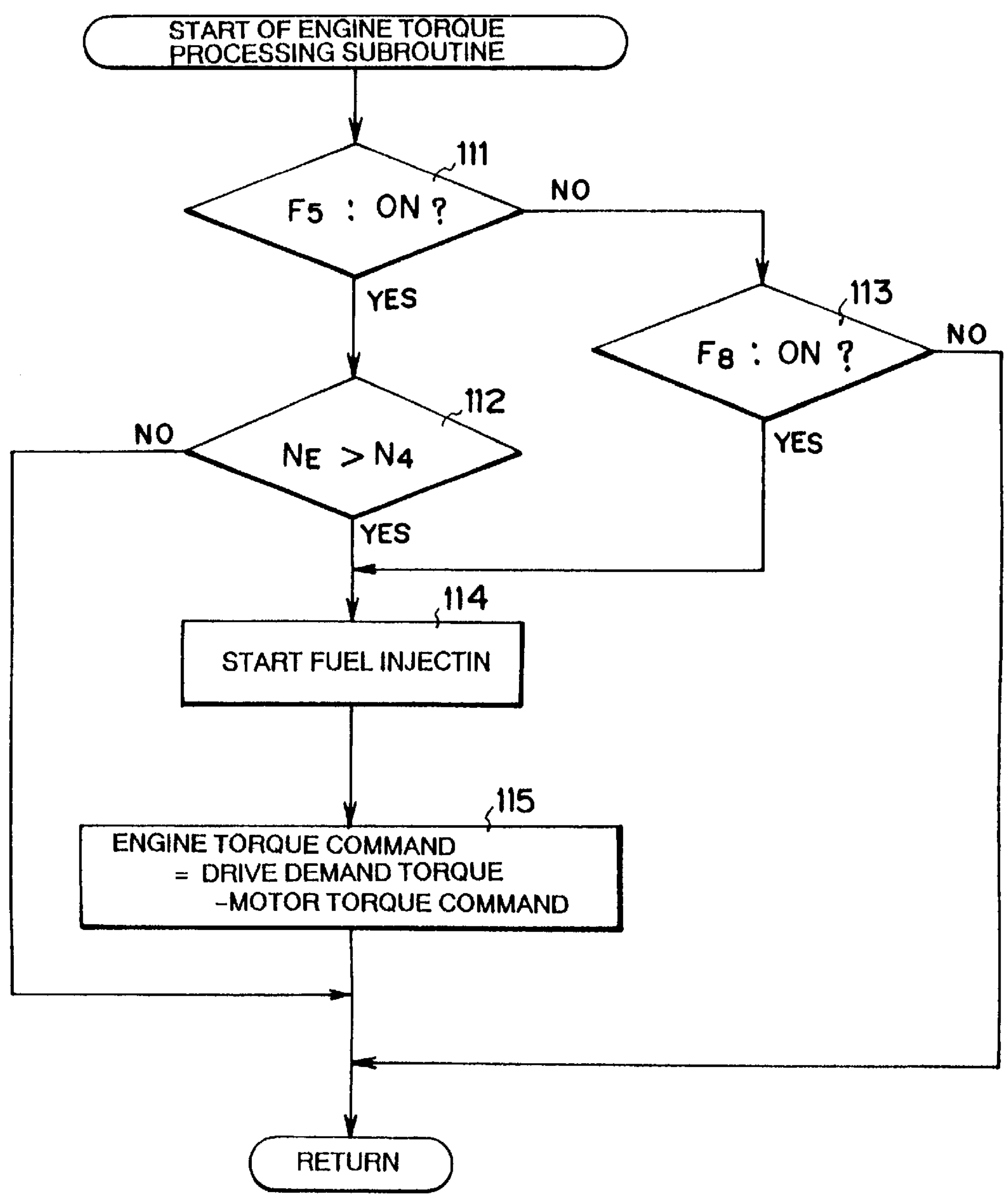
FIG. 16 is a flow chart showing an example of the control to be executed in the invention, i.e., an engine torque processing subroutine.

As shown in the entire control chart of FIG. 2, the motor torque is processed, and the engine torque processing (of Step 006) is then performed. FIG. 16 shows the engine torque processing subroutine. First of all, it is decided (at Step 111) whether or not the power-on downshift flag F5 is ON. This decision Step is similar to the foregoing Step 021 and Step 030.

When the power-on downshift is demanded so that the answer of Step 111 is YES, it is decided (at Step 112) whether or not the engine revolution speed NE is larger than a predetermined reference revolution speed N4. This reference revolution speed N4 is smaller than the motor revolution speed NM at that time and is exemplified by a value approximate to the idling revolution speed. In other words, the reference revolution speed N4 is as large as that at which the engine 1 can continue to rotate without stall by feeding it with the fuel. When the answer of Step 112 is NO, the routine is returned without any special process on the engine torque. When the answer is YES, the routine advances to Step 114.

When the downshift is not demanded so that the answer of Step 111 is NO, on the contrary, it is decided (at Step 113) whether or not the oil pressure maximum flag F8 is ON. This flag F8 is turned ON, as has been described with reference to FIG. 5, when it is decided that the engine revolution speed NE comes into synchronism with the motor revolution speed NM. When the answer of Step 113 is NO, therefore, the engine revolution speed NE is not synchronized with the motor revolution speed NM. In this case, therefore, the routine is returned without any control on the processing of the engine torque. When the answer of Step 113 is YES, on the contrary, the engine revolution speed NE is synchronized with the motor revolution speed NM. In this case, therefore, the routine advances to Step 114.

At Step 114, the injection of the fuel into the engine 1 is started. When the downshift is demanded, more specifically, the engine revolution speed NE reaches the predetermined reference revolution speed N4 as high as the idling revolution speed so that the fuel injection is started. In the ordinary case in which the downshift is not demanded, on the contrary, the fuel injection is started when it is decided that the engine revolution speed NE comes into synchronism with the motor revolution speed NM. Here, the feed of the fuel is started for the engine having no fuel injector.

Next, the engine torque command is determined by subtracting the motor torque command from the drive demand torque (at Step 1115). The drive demand torque is demanded for the run and is determined on the basis of the depression stroke or the like of the accelerator pedal. On the other hand, the motor torque command is either determined at the foregoing Step 065 or Step 066 or swept down at Step 063.

The aforementioned timing of the fuel injection is shown in FIG. 8. When the power-on downshift is demanded so that the power-on downshift flag F5 is ON, more specifically, the injection of the fuel is started at instant t8 when the engine revolution speed NE reaches the reference revolution speed N4 corresponding to the idling revolution speed. Simultaneously with this, the fuel injection flag is turned ON. At an ordinary time when the downshift is not demanded, on the contrary, the feed of the fuel is started at instant t4 when the oil pressure maximum flag F8 is turned ON, as indicated by a thin solid curve in FIG. 8.

On the other hand, the changes in the engine torque command of the aforementioned engine torque processing case are shown in FIG. 7, FIG. 14 and FIG. 15. The engine torque command value is so controlled that the sum of it and the motor torque command value is the drive demand torque. In other words, the engine torque command value rises with the reduction in the motor torque command value. For the time period from the instant t4 when the engine revolution speed NE is synchronized with the motor revolution speed NM to the predetermined time period when the stability of the engine revolution speed NE is decided, therefore, the motor torque command value is kept at the immediately preceding value, so that the engine torque command value is also kept at the same value as before.

After this, the motor torque command value is swept down so that the engine torque command value is increased according to the reduction in the motor torque command value. As a result, the drive demand torque is finally satisfied by the engine torque so that the motor torque command value is reduced to zero at the instant t5. Simultaneously with this, the input clutch application end flag F3 is turned ON. In other words, the prime mover is switched from the motor/generator 3 to the engine 1 while the driving torque being kept constant. This makes it possible to prevent the shock which might otherwise be caused by starting the engine 1 and by switching the prime mover to the engine 1.

When the power-on downshift is demanded, as described above, the control of the input clutch 5, the motor torque or the engine torque differes from that of the ordinary operation. This is because the increase in the driving force by the downshift is demanded. Since the change in the driving force by the downshift causes the shock, however, the downshift is controlled in the following manner when the engine 1 is rotated by the motor torque.

Figure 17:
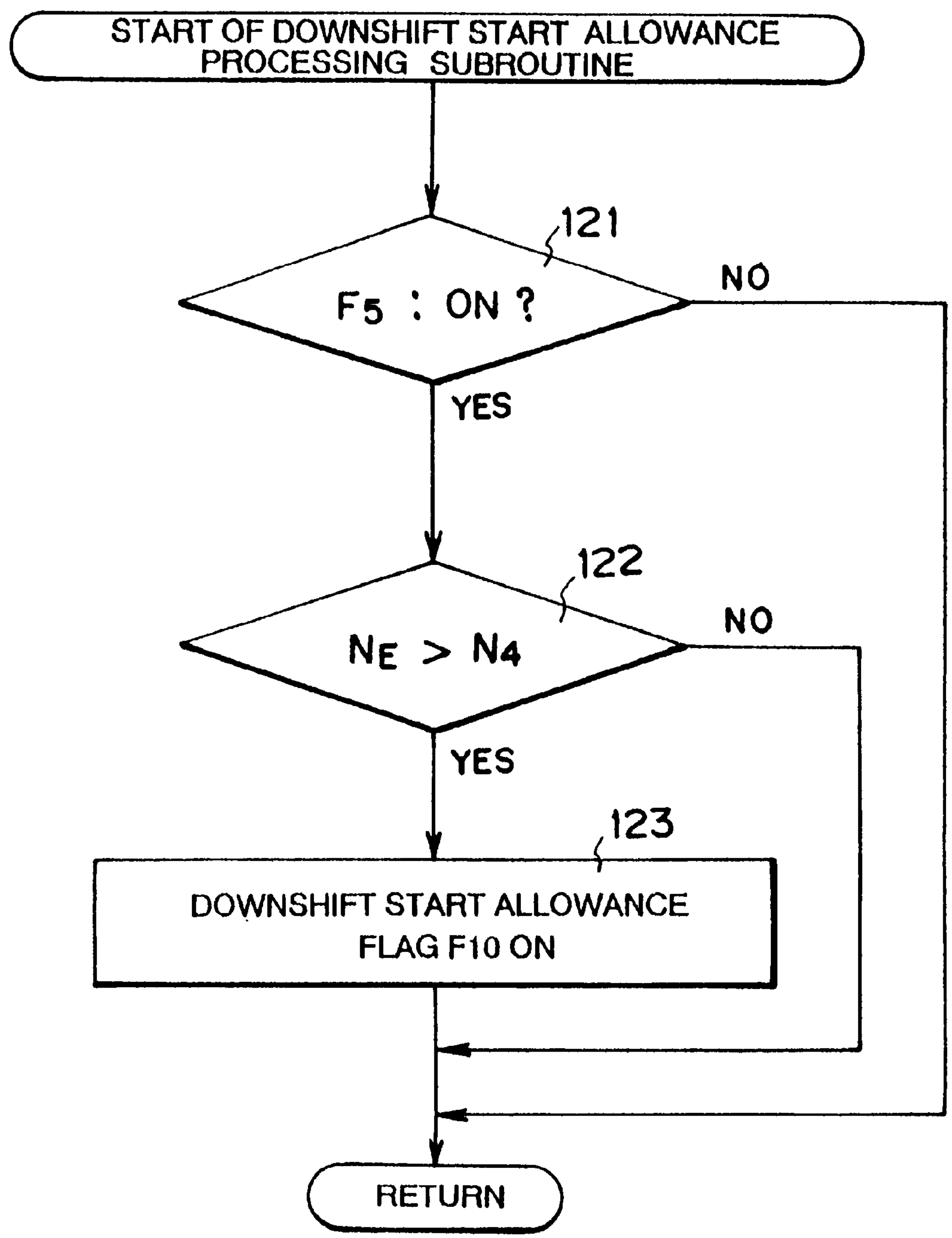
FIG. 17 is a flow chart showing an example of the control to be executed in the invention, i.e., a downshift start allowance processing subroutine.

FIG. 17 shows a subroutine of the downshift start allowance processing shown in FIG. 1. First of all, it is decided (at Step 121) whether or not the power-on downshift flag F5 is ON. This step is similar to the aforementioned Steps 021, 030 and 111. When the answer of Step 121 is NO, the routine is returned without any control. When the answer is YES, on the contrary, it is decided (at Step 122) whether or not the engine revolution speed NE is over the preset reference value N4. This reference value N4 is equal to that for determining the fuel injection timing when the downshift is demanded. In short, therefore, this Step 122 decides whether or not the engine 1 is substantially started. Here, the reference value N4 need not be always identical but may be different, if necessary, because there is a difference between the control responsibilities of the engine 1 and the transmission 13.

When the answer of this Step 122 is NO, the routine is returned without any control. When the answer of Step 122 is YES, on the contrary, a downshift start allowance flag F10 is turned ON (at Step 123). On the basis of this downshift start allowance flag F10, the control of the downshift is started by the T/M-ECU 15. Specifically, the downshift is inhibited, till the engine 1 is fed with the fuel so that it is substantially started, but is started after the engine 1 was substantially started. As a result, the change in the driving force by the downshift can be avoided with the load for rotating the engine 1 being applied to the motor/generator 3, thereby to prevent the shock. When the input torque to the transmission 13 is to be controlled at a speed changing time, moreover, the engine 1 has been already started to output the torque so that the control of the input torque can be facilitated to prevent the shock which might otherwise accompany the speed change.

In the foregoing example, the assist torque is gradually increased when it is to be added to the motor torque. This control is to prevent the shock which might otherwise be caused by the abrupt increase in the torque. On the other hand, the engine 1 is started because a high driving force is demanded. When the assist torque is to be added to the motor torque, therefore, the increasing rate of the assist torque is preferably enlarged within a range to cause no deterioration of the shock. This example will be described in the following.

Figure 18:
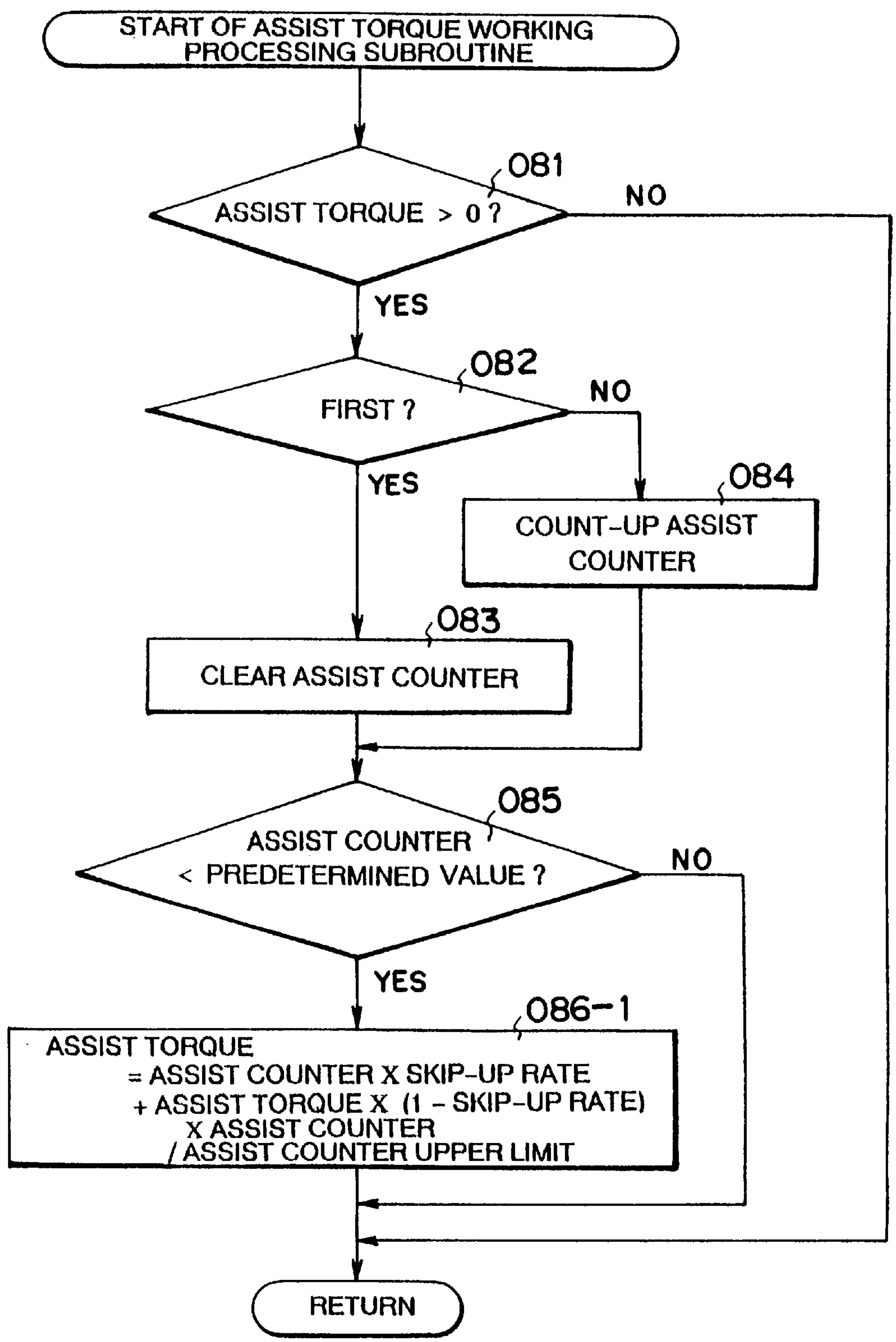
FIG. 18 is a flow chart showing an example of the control to be executed in the invention, i.e., an assist torque working processing subroutine.

FIG. 18 shows a routine in which the Step 086 of the assist torque working processing subroutine shown in FIG. 11 is replaced by Step 086-1. In the control to be executed at Step 086-1, more specifically, a torque at a predetermined rate of the assist torque computed at Step 074 shown in FIG. 10 is outputted as a first command value, and the assist torque is then gradually increased. More specifically, the assist torque to be increased at first is determined by multiplying the assist torque, as determined as the sum of the motoring torque and the inertia torque, by a skip-up rate. This skip-up rate is a preset value for raising the torque to such an extent as to cause no shock. Moreover, the skip-up rate may take a fixed value but may be a variable, that is, a value to be determined from a map employing the vehicle speed or the like as a parameter.

The assist torque is gradually increased from the starting point of the motor torque command thus skipped up. As specified at Step 086-1 of FIG. 18, more specifically, the assist torque to be finally set is multiplied by (1—the skip-up rate), and this product is further multiplied by the ratio of the assist counter to the upper limit of the assist counter value. In a qualitative description of this, the remainder of the assist torque after the skip-up is repeatedly increased by the value which is divided by the assist counter upper limit.

The changes in the motor torque command in the case of that skip-up of the assist torque command are shown in FIG. 15. By the skip-up, more specifically, the motor torque command value rises from the state (a) to the state (d). In this case, the motor torque command value and the motor torque rise abruptly with a certain width, but no shock is caused by setting the skip-up rate to a proper value. After this, the motor torque command value and the motor torque rise by the values which are divided on the basis of the assist counter upper limit. Thus, the torque for rotating the engine 1 quickly increases. As a result, the engine revolution speed NE quickly rises so that the engine 1 early outputs the torque to avoid the delay feeling of the control. Here, in FIG. 15, the change in the motor torque command value, as indicated by (a)–(b)–(c), corresponds to that in the case where neither the processing shown in FIG. 11 nor the processing shown in FIG. 18 is performed. When the assist torque is high, that is, when the changing width of the motor torque command value is large, the output shaft torque may change highly for a while to cause the shock.

When the engine revolution speed NE is to be raised, the motor torque command value is set to the sum of the drive demand torque and the assist torque, as has been described with reference to FIG. 12. On the other hand, the synchronization of the engine revolution speed NE with the motor revolution speed NM is decided from a continuation of such a state for a certain time period that the difference between those revolution speeds NE and NM is smaller than a predetermined value. As a result, the synchronization is not instantly decided even if the engine revolution speed NE exceeds the motor revolution speed NM for a while. Thus, if the motor torque having the additional assist torque for rotating the engine 1 is continuously outputted, the motor torque may become relatively excessive to cause the shock. This disadvantage is avoided by the control shown in FIG. 19.

Figure 19:
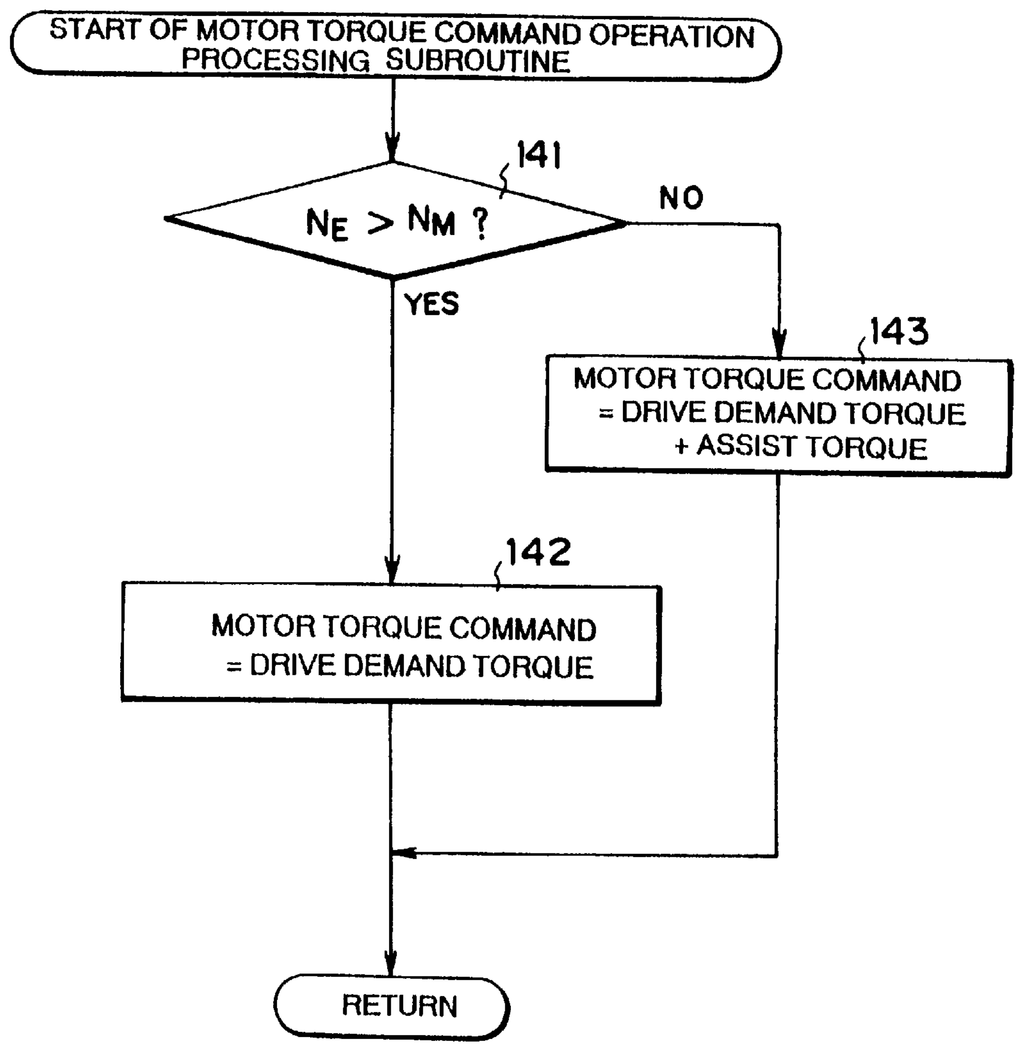
FIG. 19 is a flow chart showing an example of the control to be executed in the invention, i.e., a motor torque command operation processing subroutine.

The routine shown in FIG. 19 is a motor torque command operation processing subroutine, as contained in the aforementioned motor torque processing of Step 005 shown in FIG. 2. First of all, it is decided (at Step 141) whether or not the engine revolution speed NE is over the motor revolution speed NM. Since the assist torque is added so as to raise the engine revolution speed NE to the motor revolution speed NM, as described hereinbefore, the engine revolution speed NE need not be raised any more when it reaches the motor revolution speed NM. When the answer of Step 141 is YES, therefore, the motor torque command is set to a value corresponding to the drive demand torque (at Step 142). When the engine revolution speed NE is below the motor revolution speed NM, on the contrary, the motor torque command is set to a value corresponding to the summed torque of the drive demand torque and the assist torque (at Step 143).

Figure 20A:
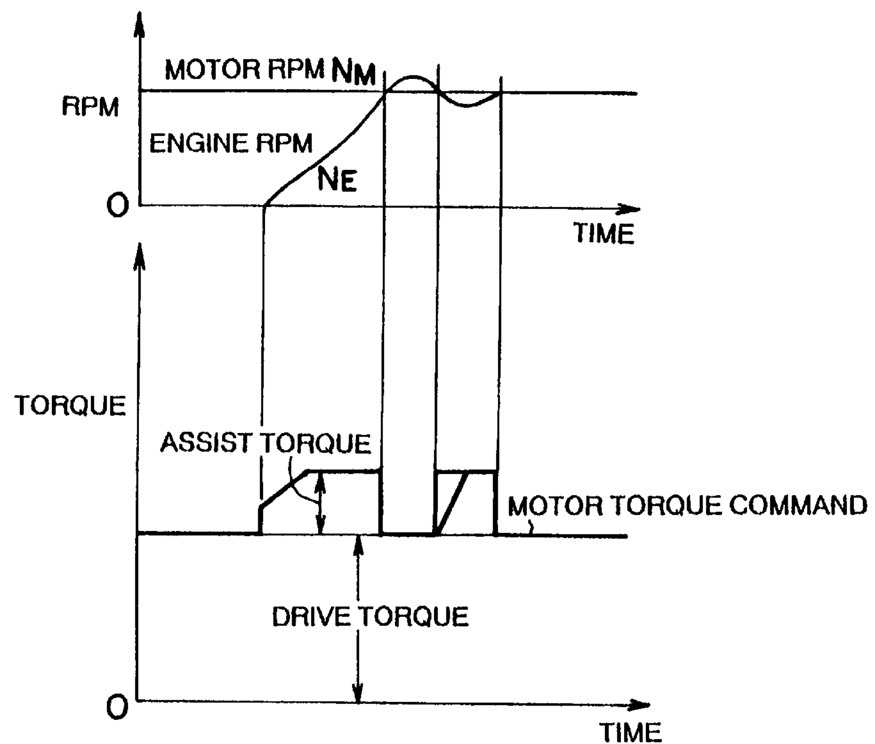
FIG. 20A is an explanatory diagram showing a change in the motor torque command in the case where the processing of FIG. 19 is executed.

The changes in the motor torque command in the case where the control shown in FIG. 19 is made are shown in FIG. 7 and FIG. 20A. In the range where the engine revolution speed (RPM) NE exceeds the motor revolution speed (RPM) NM, as shown in these figures, the assist torque is deleted from the motor torque so that only the driving torque for the run is outputted. When the engine revolution speed NE is exceeded again by the motor revolution speed NM, there is outputted a summed motor torque of the driving torque and the assist torque. As a result, no assist torque is outputted with the engine revolution speed NE exceeding the motor revolution speed NM, to prevent the driving force from becoming temporarily excessive and the shock from accordingly occurring.

Figure 20B:
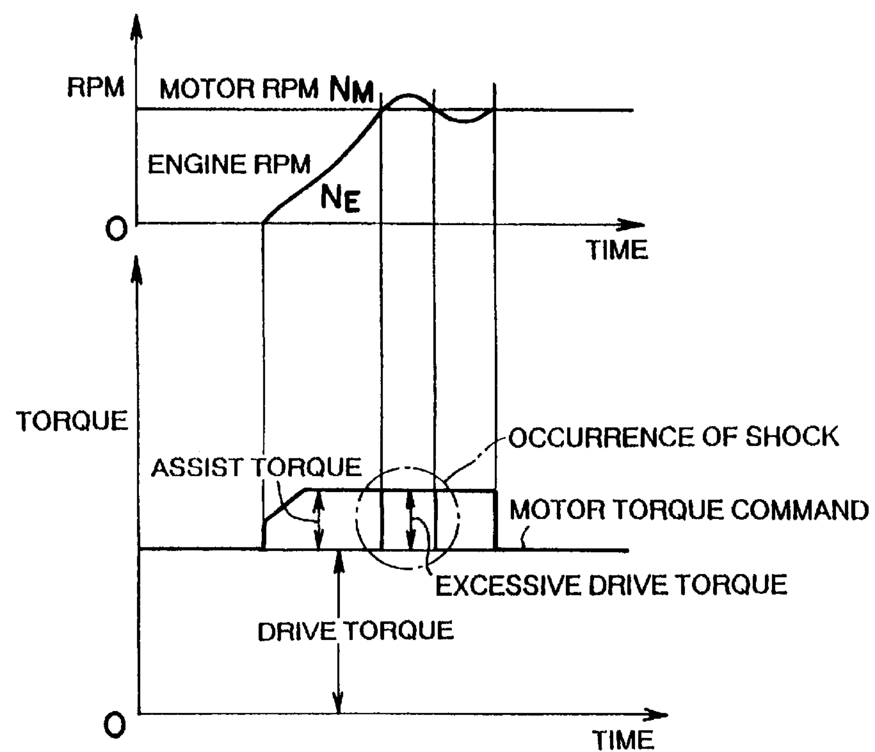
FIG. 20B is an explanatory diagram showing a change in the motor torque command in the case where the processing of FIG. 19 is not executed.

When the assist torque is continuously outputted irrespective of the value of the engine revolution speed NE, as shown in FIG. 20B, on the contrary, the driving torque may become excessive when the engine revolution speed (RPM) NE exceeds the motor revolution speed (RPM) NM, to cause the shock.

Here, after the engine revolution speed NE exceeded the motor revolution speed NM, the engine revolution speed NE is exceeded again by the motor revolution speed NM so that the assist torque is added. It is then preferable to perform the aforementioned assist torque working processing, as shown in FIG. 11. If this torque working processing is performed, the motor torque rises gently, as indicated by a thick solid curve in FIG. 20A, so that the shock due to an abrupt change in the driving force can be prevented.

Here, the torque to be outputted by the motor/generator 3 is limited, as has been described with reference to FIG. 9. When the motor torque command value exceeds the upper limit torque of the motor/generator 3, the motor torque guard value is adopted as the motor torque command value. In this case, too, if the motor torque is kept at the upper limit value, the driving torque rises when the engine revolution speed NE exceeds the motor revolution speed NM. When the engine revolution speed NE exceeds the motor revolution speed NM, more specifically, of the motor torque, the torque, as used for rotating the engine 1, is added to the driving torque for the run. As a result, the driving torque may rise to cause the shock.

Figure 21:
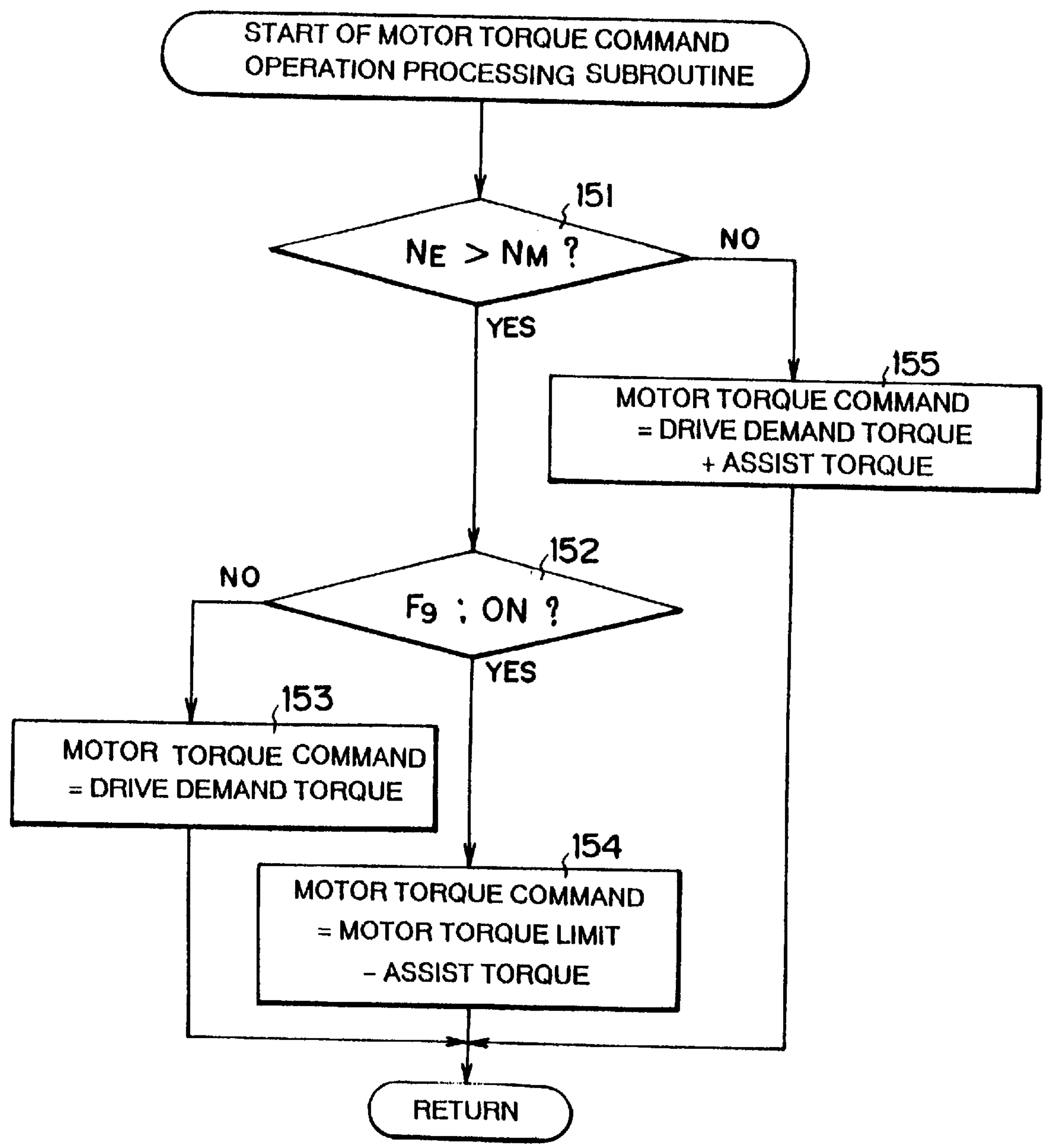
FIG. 21 is a flow chart showing an example of the control to be executed in the invention, i.e., a motor torque command operation processing subroutine.

FIG. 21 is a flow chart showing a motor torque command operation processing subroutine in the case where the motor torque command value has reached the motor torque guard value. First of all, it is decided (at Step 151) whether or not the engine revolution speed NE exceeds the motor revolution speed NM. When the answer of this Step 151 is YES, it is decided (at Step 152) whether or not the motor torque guard flag F9 is ON. This motor torque guard flag F9 is turned ON, as has been described with reference to FIG. 9, when the motor torque command value exceeds the motor torque guard value.

When the motor torque command value fails to exceed the motor torque guard value so that the answer of Step 152 is NO, a motor torque command corresponding to the drive demand torque is outputted (at Step 153). In the state of the vehicle where the answer of Step 152 is NO, more specifically, the torque to be outputted by the motor/generator 3 is still sufficient, and the engine revolution speed NE is over the motor revolution speed NM. Hence, the motor torque command value is set to a command value corresponding to the drive demand torque. This is similar to the aforementioned control of Step 142 of FIG. 19.

When the motor torque guard flag F9 is ON so that the answer of Step 152 is YES, on the contrary, there is outputted (at Step 154) a motor torque command corresponding to the torque which is computed by subtracting the assist torque from the motor torque limit value. Here, the torque to be subtracted from the motor torque limit value should not be limited to the assist torque but may be a predetermined value. This is because the sum of the drive demand torque and the assist torque is not accurately coincident with the motor torque limit value at all times.

Here, when the engine revolution speed NE fails to exceed the motor revolution speed NM so that the answer of Step 151 is NO, there is outputted (at Step 155) a motor torque command value corresponding to a summed torque of the drive demand torque and the assist torque. This is similar to the control of Step 143 of FIG. 19.

Figure 22A:
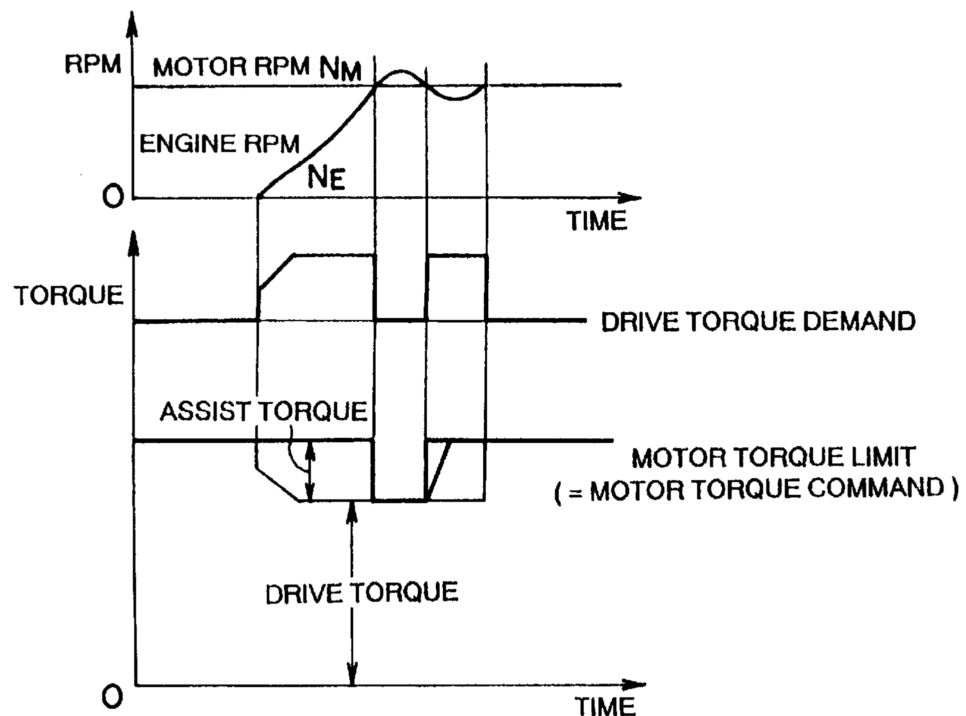
FIG. 22A is an explanatory diagram showing a change in the motor torque command in the case where the processing of FIG. 21 is executed.
Figure 22B:
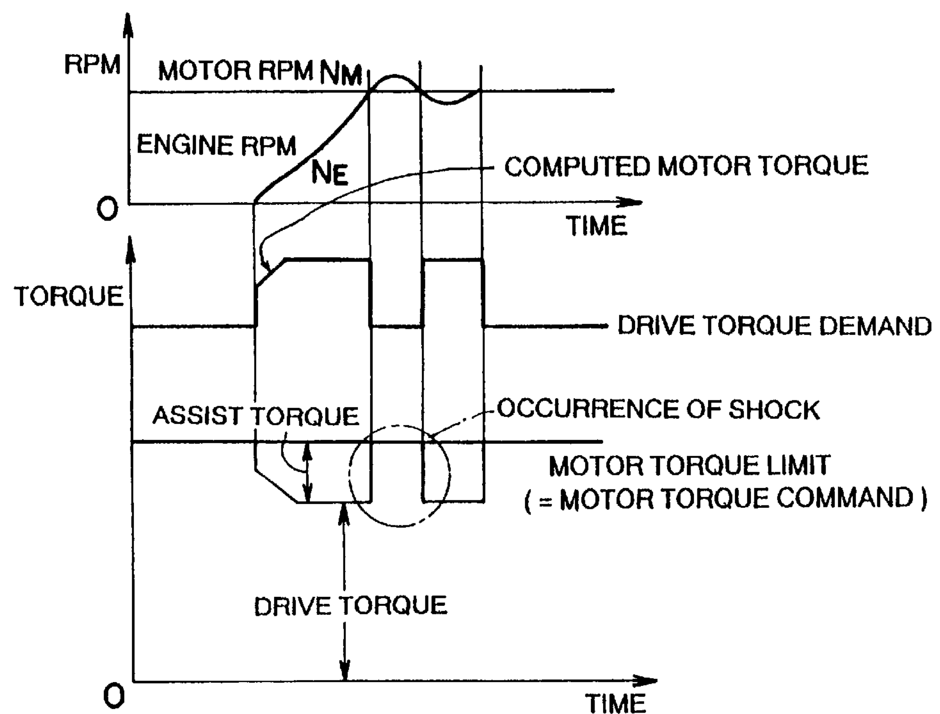
FIG. 22B is an explanatory diagram showing a change in the motor torque command in the case where the processing of FIG. 21 is not executed.

The changes in the motor torque with and without the execution of the aforementioned control of Step 154 are shown in FIGS. 22A and 22B. FIG. 22A shows the change in the motor torque in the case where the control of Step 154 is executed. In the state where the engine revolution speed (RPM) NE exceeds the motor revolution speed (RPM) NM, the torque corresponding to the assist torque is subtracted from the limit value of the motor torque. Of the torque outputted by the motor/generator 3, therefore, the torque, as used for rotating the engine 1, becomes unnecessary and is subtracted from the motor torque. As a result, the driving torque does not relatively rise so that the shock, as might otherwise accompany a temporary increase in the driving torque, can be prevented. When the control of Step 154 is not executed, on the contrary, the driving torque relatively rises with the engine revolution speed (RPM) NE being over the motor revolution speed (RPM) NM, as shown in FIG. 22B. As a result, the rise in the driving torque may be physically felt as the shock.

Here will be summarized the corresponding relations between the specific embodiment thus far described and the construction of the invention. The engine 1 corresponds to the internal combustion engine; the motor/generator 3 corresponds to the electric motor; the input clutch 5 corresponds to the clutch mechanism of the invention; and the transmission 13 corresponds to the automatic transmission of the invention. Moreover, the output shaft 4 of the motor/generator 3, the automatic transmission coupled to the former, and the output shaft 16 of the transmission 13 correspond to the power transmission line of the invention.

Moreover, the ECU for performing the function of Step 001 shown in FIG. 2 corresponds to the start demand deciding means of the invention, and the ECU for performing the function of Step 074 shown in FIG. 10 corresponds to the assist torque setting means of the invention. The ECU for performing the functions of Step 141 of FIG. 19 and Step 151 of FIG. 21 corresponds to the synchronism detecting means of the invention, and the ECU for performing the functions of Step 142 of FIG. 19 and Step 154 of FIG. 21 corresponds to the torque reducing means of the invention. The ECU for performing the functions of Step 142 of FIG. 19 and Step 154 of FIG. 21 corresponds to the "either of the means" of the invention. The ECU for performing the functions of Step 141 of FIG. 19 and Step 151 of FIG. 21 corresponds to the revolution speed reduction detecting means of the invention, and the ECU for performing the functions of Step 143 of FIG. 19 and Step 155 of FIG. 21 corresponds to the torque raising means of the invention.

The ECU for performing the function of Step 102 of FIG. 13 corresponds to the electric motor revolution speed detecting means of the invention, and the ECU for performing the function of Step 104 of FIG. 13 corresponds to the output torque raising means of the invention. The ECU for performing the functions of Steps 35 and 37 of FIG. 5 and Step 113 of FIG. 16 corresponds to the synchronism detecting means of the invention, and the ECU for performing the function of Step 114 of FIG. 16 corresponds to the fuel feed starting means. The ECU for performing the functions of Step 063 of FIG. 9 and Step 115 of FIG. 16 corresponds to the torque control means. The ECU for performing the function of Step 062 of FIG. 9 corresponds to the revolution speed stability deciding means, and the ECU for performing the functions of Step 063 of FIG. 9 and Step 115 of FIG. 16 corresponds to the "means for gradually raising torque".

Moreover, the ECU for performing the functions of Step 001 of FIG. 2 and Step 121 of FIG. 17 corresponds to the simultaneous decision detecting means, and the ECU for performing the function of Step 123 of FIG. 17 corresponds to the downshift allowance means. The ECU for performing the functions of Step 001 of FIG. 2 and Step 015 of FIG. 3 corresponds to the simultaneous decision detecting means, and the ECU for performing the function of Step 017 of FIG. 3 corresponds to the initial pressure feed control means. The ECU for performing the functions of Step 001 of FIG. 2 and Step 021 of FIG. 3 corresponds to the simultaneous decision detecting means, and the ECU for performing the function of Step 023 of FIG. 3 corresponds to the standby pressure control means. The ECU for performing the functions of Step 001 of FIG. 2 and Step 111 of FIG. 16 corresponds to the simultaneous decision detecting means, and the ECU for performing the functions of Steps 112 and 114 of FIG. 16 corresponds to the fuel feed start control means. The ECU for performing the functions of Step 001 of FIG. 2 and Step 030 of FIG. 4 corresponds to the simultaneous decision detecting means, and the ECU for performing the function of Step 032 of FIG. 4 corresponds to the pressure rise control means.

Here, the foregoing specific embodiment has been applied to the hybrid vehicle which has such a structure that the output shaft of the engine is connected to the output shaft of the motor/generator through the input clutch. However, the invention should not be limited to that embodiment but can be applied to a hybrid vehicle which is constructed such that an internal combustion engine is coupled to a power transmission mechanism or an electric motor through a gear mechanism. In short, the invention may be applied to the so-called "parallel hybrid type drive unit". When the active states of the internal combustion engine and the electric motor are to be decided, therefore, the embodiment contrasts their revolution speeds directly. When the gear mechanism is interposed between the power transmission mechanism and the electric motor or the internal combustion engine, however, the active states of the electric motor and the internal combustion engine may be decided by contrasting the revolution speed of one of them with a predetermined value based upon the revolution speed of the other. This decision is meant in the invention by the "reference value determined on the basis of the revolution speed of the electric motor".

Here will be synthetically described the advantages to be achieved by the invention. According to the invention, when the internal combustion engine is to be started while the vehicle is being run by the electric motor, the torque to be outputted from the electric motor is set to the sum of the torque necessary for keeping the running state and the torque necessary for rotating the internal combustion engine. This setting makes it possible to prevent the reduction in the driving force for the run and to avoid the shock due to the start of the internal combustion engine in advance.

When the internal combustion engine is started so that its revolution speed reaches that of the electric motor, the run can be kept by the output of the internal combustion engine. By lowering the output torque of the electric motor, therefore, the driving force of the entire hybrid vehicle can be prevented from becoming excessive while preventing the shock.

When the revolution speed of the internal combustion engine reaches that of the electric motor, moreover, of the torque outputted by the electric motor, the torque corresponding to the torque used for rotating the internal combustion engine is reduced. This reduction makes it possible to prevent an abrupt change in the driving force of the entire hybrid vehicle and the shock which might otherwise be caused by the abrupt change before and after the start of the internal combustion engine.

According to the invention, while the internal combustion engine is rotated by the output torque of the electric motor so that it may be started, a shortage in either the output torque of the electric motor or the torque for rotating the internal combustion engine can be detected in terms of the reduction in the revolution speed of the internal combustion engine, and the output torque of the electric motor can be raised on the basis of the detection result. As a result, it is possible to prevent a temporary shortage of the driving force during the run and the resultant shock.

According to the invention, while the internal combustion engine is rotated by the electric motor so that it may be started, the excess or shortage of the output of the electric motor is monitored at all times in terms of the revolution speed of the electric motor so that the output of the electric motor is increased when the revolution speed drops due to the shortage of the output of the electric motor. As a result, it is possible to prevent a temporary reduction of the driving force and the resultant shock in advance.

According to the invention, when the internal combustion engine is rotated by the electric motor so that it may be started, the fuel is fed to the internal combustion engine at the instant when the revolution speed of the internal combustion engine comes into synchronism with that of the electric motor. At this instant, there has ended the state in which the electric motor outputs not only the motive force for the run but also the motive force for rotating the internal combustion engine. For the driving power for the run, therefore, the output of the internal combustion engine is not added to that of the electric motor. As a result, it is possible to prevent a temporary rise in the driving force and the resultant shock.

According to the invention, as the fuel is fed to the internal combustion engine so that the engine starts to output the torque, the output of the electric motor is accordingly lowered. As a result, the driving force is kept constant as a whole by the increase and decrease of those outputs so that the shock due to the abrupt change in the driving force can be prevented.

According to the invention, the fluctuation in the revolution speed of the internal combustion engine, i.e., the fluctuation in the output exerts no influence upon the driving force for the run so that the shock due to the change in the driving force can be prevented. Immediately after the start of the internal combustion engine, more specifically, the revolution speed of the internal combustion engine may be made unstable by the low revolution speed. In this unstable state, however, the torque to be transmitted from the internal combustion engine to the power transmission line is not gradually raised so that the disturbance in the driving force and the resultant shock can be prevented.

According to the invention, when the revolution speed of the internal combustion engine rises so high that the internal combustion engine starts its outputting with the feed of the fuel, a downshift can be effected in the automatic transmission. When the start of the internal combustion engine and the downshift in the automatic transmission are simultaneously decided, the downshift is executed as soon as possible without awaiting the synchronization between the revolution speeds of the internal combustion engine and the electric motor. As a result, the delay in the rise of the driving force can be avoided in advance.

According to the invention, the time period for continuously feeding the initial pressure to the clutch means for coupling the internal combustion engine and the power transmission line at the time of starting its engagement is longer, when the start of the internal combustion engine and the downshift in the automatic transmission are simultaneously decided, than the remaining cases. Therefore, the timing at which the clutch means substantially starts to take the transmission torque capacity is made earlier. As a result, the internal combustion engine is started earlier than when the downshift is not simultaneously decided, so that the delay in the control to raise the driving force can be avoided.

According to the invention, the standby pressure to be fed at the engagement start control time to the clutch means for coupling the internal combustion engine and the power transmission line is made higher, when the start of the internal combustion engine and the downshift in the automatic transmission are simultaneously decided, than the remaining cases. Therefore, the incomplete engagement state, in which the clutch means is held standby, comes closer to the complete engagement state. As a result, the revolution speed of the internal combustion engine is raised at an earlier timing, that is, the internal combustion engine is started earlier than when the downshift is not simultaneously decided, so that the delay in the control to raise the driving force can be avoided.

According to the invention, when the start of the internal combustion engine and the downshift in the automatic transmission are simultaneously decided, the feed of the fuel to the internal combustion engine and the timing for the substantial outputting of the internal combustion engine are effected earlier than the remaining cases. As a result, it is possible to improve the responsibility to the demand for the driving force.

According to the invention, when the start of the internal combustion engine and the downshift in the automatic transmission are simultaneously decided, the clutch means for inputting the torque to the internal combustion engine from the electric motor is substantially applied to have a transmission torque capacity earlier than the remaining cases because the oil pressure has a high rising gradient. As a result, the timing for raising the revolution speed of the internal combustion engine to that of the electric motor or the timing for feeding the internal combustion engine with the fuel to start it substantially is made earlier. As a result, it is possible to improve the responsibility to the demand for increasing the driving force.

What is claimed is:

1. A drive control system for starting an internal combustion engine of a hybrid vehicle running while transmitting the output of an electric motor to a power transmission line for the run, by coupling the internal combustion engine to the power transmission line, comprising:

start demand deciding means for deciding a demand for the start of said internal combustion engine; and assist setting means for raising the output torque of said electric motor, when the demand for starting said internal combustion engine is decided by said start demand deciding means, by a torque corresponding to one of the following:

(a) a motoring torque necessary for rotating said internal combustion engine; and (b) a summed torque of said motoring torque, with the addition of an inertia torque according to the changing rate of the revolution speed of said internal combustion engine, wherein said assist setting means includes means for determining said motoring torque on the basis of a map determining a torque necessary for rotating said internal combustion engine for each revolution speed of said internal combustion engine.

2. A drive control system according to claim 1, wherein said start demand deciding means includes means for deciding the demand for the start of said internal combustion engine in terms of at least one of the revolution speed of said electric motor, a charged state of a battery connected with said electric motor and the degree of opening of an accelerator for controlling the driving force of said hybrid vehicle.

3. A drive control system according to claim 1, further comprising:

assist torque working means for equally dividing an assist torque, which is set in said assist setting means, into a plurality of torques, to output a command signal for raising the output torque of said electric motor by the equally divided torques.

4. A drive control system according to claim 1, further comprising:

assist torque working means for outputting a command signal to raise the output torque of said electric motor by a predetermined amount of the assist torque which was set by said assist setting means, and for dividing the remaining assist torque into a plurality of torques, to output a command signal to raise the output torque of said electric motor by the divided torques.

5. A drive control system for starting an internal combustion engine of a hybrid vehicle running while transmitting the output of an electric motor to a power transmission line for the run, by coupling the internal combustion engine to the power transmission line, comprising:

synchronism detecting means for detecting that the revolution speed of said internal combustion engine exceeds one of the following:

(a) the revolution speed of said electric motor;

(b) a reference value determined on the basis of the revolution speed of said electric motor after said internal combustion engine was coupled to said power transmission line to start the start control of said internal combustion engine; and an after-synchronism control executing means for executing an after synchronism control on at least one of said electric motor and said internal combustion engine when said synchronism detecting means detects that the revolution speed of said internal combustion engine exceeds one of the following:

(a) the revolution speed of said electric motor; and (b) the reference value determined on the basis of the revolution speed of said electric motor;

wherein said after-synchronism control executing means includes torque reducing means for reducing the output torque of said electric motor, and said torque reducing means includes at least one of means for reducing the output torque of said electric motor, as raised for starting said internal combustion engine, and means for reducing the output torque of said electric motor even when the output torque of said electric motor is not raised at the time of starting said internal combustion engine; and revolution speed reduction detecting means for detecting that the revolution speed of said internal combustion engine is exceeded by the revolution speed of one of the following:

(a) said electric motor; and (b) another reference value determined on the basis of the revolution speed of said electric motor while said internal engine is rotated by the output of said electric motor; and torque raising means for raising the output torque of said electric motor when said revolution speed reduction detecting means detects that the revolution speed of said internal combustion engine is exceeded by the revolution speed of one of the following:

(a) said electric motor; and (b) said another reference value determined on the basis of the revolution speed of said electric motor.

6. A drive control system according to claim 5, wherein said after-synchronism control executing means includes fuel feed starting means for starting the feed of a fuel to said internal combustion engine.

7. A drive control system for starting an internal combustion engine of a hybrid vehicle running while transmitting the output of an electric motor to a power transmission line for the run, by coupling the internal combustion engine to the power transmission line, comprising:

electric motor revolution speed detecting means for detecting a reduction in the revolution speed of said electric motor while said internal combustion engine is being started by setting the output torque of said electric motor to a predetermined value; and output torque raising means for raising the output torque of said electric motor when the reduction in the revolution speed of said electric motor is detected by said electric motor revolution speed detecting means.

8. A drive control system for starting an internal combustion engine of a hybrid vehicle running while transmitting the output of an electric motor to a power transmission line for the run, by coupling the internal combustion engine to the power transmission line, comprising:

torque reducing means for gradually reducing the torque to be transmitted from said electric motor to said power transmission line, after said internal combustion engine was coupled to said power transmission line to rotate said internal combustion engine and after the feed of a fuel to said internal combustion engine was started;

revolution speed stability deciding means for deciding the stability of the revolution speed of said internal combustion engine, after said internal combustion engine was coupled to said power transmission line to rotate said internal combustion engine and after the feed of a fuel to said internal combustion engine was started; and torque raising means for gradually raising the torque to be transmitted from said internal combustion engine to said power transmission line, after the stability of the revolution speed of said internal combustion engine was decided by said speed stability deciding means.

9. A drive control system according to claim 8, wherein said revolution speed stability deciding means includes means for deciding that the revolution speed of said internal combustion engine has been stabilized, in terms of the fact that a time period elapsed from the start of the feed of the fuel to said internal combustion engine reaches a predetermined value.

10. A drive control system according to claim 8, wherein said revolution speed stability deciding means includes means for deciding the stability of the revolution speed of said internal combustion engine on the basis of the revolution speed of said internal combustion engine.

11. A drive control system for starting an internal combustion engine of a hybrid vehicle running while transmitting the output of an electric motor to a power transmission line for the run, by coupling the internal combustion engine to the power transmission line, wherein the power transmission line includes an automatic transmission having gear ratios controlled on the basis of the running state, comprising:

simultaneous decision detecting means for detecting that the start of said internal combustion engine and a downshift in said automatic transmission are simultaneously decided; and special control executing means for executing a special control accompanying the holding of the downshift decision, when said simultaneous decision detecting means detects that the start of said internal combustion engine and the downshift in said automatic transmission are simultaneously decided.

12. A drive control system according to claim 11, wherein said special control executing means includes downshift allowance means for allowing said downshift when the revolution speed of said internal combustion engine exceeds a predetermined value.

13. A drive control system according to claim 11, wherein said special control executing means includes downshift allowance means for allowing said downshift when the revolution speed of said internal combustion engine exceeds a revolution speed approximate to an idling revolution speed.

14. A drive control system according to claim 11, wherein said special control executing means includes fuel feed start control means for making the timing of feeding the fuel to said internal combustion engine earlier than that in the case where the start of said internal combustion engine and the downshift in said automatic transmission are not simultaneously decided.

15. A drive control system according to claim 14, wherein said fuel feed start control means includes means for starting the feed of the fuel to said internal combustion engine when the revolution speed of said internal combustion engine reaches a value approximate to an idling revolution speed, if the start of said internal combustion engine and the downshift in said automatic transmission are simultaneously decided.

16. A drive control system according to claim 11, further comprising:

a clutch mechanism for coupling said internal combustion engine to said power transmission line as a fluid pressure is fed to raise a transmission torque capacity, wherein said special control executing means includes initial pressure feed control means for making a feed continuation time period of a predetermined initial pressure to be fed at the beginning of the engagement start of said clutch mechanism longer than that in the case where the start of said internal combustion engine and the downshift in said automatic transmission are not simultaneously decided when said simultaneous decision detecting means detects that the start of said internal combustion engine and the downshift in said automatic transmission are simultaneously decided.

17. A drive control system according to claim 16, further comprising:

learning means for altering the feed continuation time period of said initial pressure in accordance with the time period from the start of the feed of said initial pressure to the start of said internal combustion engine.

18. A drive control system according to claim 11, further comprising:

a clutch mechanism for coupling said internal combustion engine to said power transmission line as a fluid pressure is fed to raise a transmission torque capacity, wherein said special control executing means includes standby pressure control means for making a standby pressure for holding said clutch mechanism in an incompletely engagement state higher than that in the case where the start of said internal combustion engine and the downshift in said automatic transmission are not simultaneously decided when said simultaneous decision detecting means detects that the start of said internal combustion engine and the downshift in said automatic transmission are simultaneously decided.

19. A drive control system according to claim 18, further comprising:

means for altering a command signal for setting said standby pressure in accordance with an oil temperature.

20. A drive control system according to claim 11, further comprising:

a clutch mechanism for coupling said internal combustion engine to said power transmission line as a fluid pressure is fed to raise a transmission torque capacity, wherein said special control executing means includes pressure rise control means for making a rising gradient of a transmission torque capacity of said clutch mechanism larger than that in the case where the start of said internal combustion engine and the downshift in said automatic transmission are not simultaneously decided when said simultaneous decision detecting means detects that the start of said internal combustion engine and the downshift in said automatic transmission are simultaneously decided.

21. A drive control system according to claim 20, wherein said rising pressure control means includes means for executing a control to increase the rising gradient of said transmission torque capacity till the revolution speed of said internal combustion engine reaches a predetermined value.

22. A drive control system according to claim 20, wherein said rising pressure control means includes means for executing a control to increase the rising gradient of said transmission torque capacity till the revolution speed of said internal combustion engine reaches a value approximate to an idling revolution speed.

* * * * *

UNITED STATES PATENT AND TRADEMARK OFFICE
CERTIFICATE OF CORRECTION

PATENT NO. : 6,077,186 Page 1 of 1
DATED : June 20, 2000
INVENTOR(S) : Shinichi Kojima et al.

It is certified that error appears in the above-identified patent and that said Letters Patent is hereby corrected as shown below:

Column 29,
Line 34, after "said" insert -- revolution --.

Signed and Sealed this

Fourteenth Day of August, 2001

Attest:

NICHOLAS P. GODICI

*Attesting Officer* *Acting Director of the United States Patent and Trademark Office*